(12) United States Patent
Beausoleil

(10) Patent No.: US 12,258,775 B2
(45) Date of Patent: Mar. 25, 2025

(54) SYSTEMS, DEVICES AND METHODS FOR FACILITATING THE INSTALLATION OF CONDUCTIVE WIRES AND DATA CABLES MOUNTED ON PERIMETER SECURITY FENCES

(71) Applicant: Mind Head LLC, Ridgewood, NJ (US)

(72) Inventor: David M. Beausoleil, Ridgewood, NJ (US)

(73) Assignee: Mind Head LLC, Ridgewood, NJ (US)

( * ) Notice: Subject to any disclaimer, the term of this patent is extended or adjusted under 35 U.S.C. 154(b) by 277 days.

(21) Appl. No.: 17/750,988

(22) Filed: May 23, 2022

(65) Prior Publication Data

US 2023/0374816 A1 Nov. 23, 2023

(51) Int. Cl.
*E04H 17/00* (2006.01)
*E04H 17/20* (2006.01)

(52) U.S. Cl.
CPC .......... *E04H 17/017* (2021.01); *E04H 17/20* (2013.01)

(58) Field of Classification Search
CPC .......... A01K 3/00; A01K 3/004; A01K 3/005; E04H 17/00; E04H 17/006; E04H 17/017; E04H 17/20; G08B 13/122
See application file for complete search history.

(56) References Cited

U.S. PATENT DOCUMENTS

| | | | | | |
|---|---|---|---|---|---|
| 1,794,467 | A | * | 3/1931 | George | F21V 33/006 |
| | | | | | 256/33 |
| 2,345,771 | A | * | 4/1944 | Reynolds | G08B 13/122 |
| | | | | | 340/566 |
| 3,222,509 | A | * | 12/1965 | Thedford | E04H 17/017 |
| | | | | | 362/267 |
| 4,097,025 | A | * | 6/1978 | Dettmann | G08B 13/169 |
| | | | | | 340/566 |
| 4,826,448 | A | * | 5/1989 | Maddock | F21V 21/002 |
| | | | | | 439/409 |

(Continued)

OTHER PUBLICATIONS

Impasse II—High Security Steel Palisade Fencing, www.ameristarperimeter.com, Oct. 2021, 12 pages, Ameristar, Tulsa, Oklahoma, USA.

*Primary Examiner* — Amber R Anderson
*Assistant Examiner* — Kevin J Baynes
(74) *Attorney, Agent, or Firm* — Charney IP Law LLC

(57) ABSTRACT

A perimeter security fence includes a plurality of vertical fence posts spaced from one another along a fence line of the perimeter security fence, each vertical fence post having an upper end and a lower end. A wire receiving slot is formed in each vertical fence post. Each wire receiving slot having an open, upper end and a closed, lower end. One or more conductive wires or cables are disposed within the wire receiving slots of the vertical fence posts. At least one reinforcing plate is secured to each vertical fence post for covering a gap in the vertical fence post defined by the wire receiving slot. The at least one reinforcing plate is configured to enhance the structural integrity of the vertical fence post in the vicinity of the wire receiving slot and retain the one or more conductive wires or cables within the wire receiving slot. One or more security devices are secured to the perimeter security fence and are coupled with the one or more conductive wires or cables disposed within the wire receiving slots of the vertical fence posts.

20 Claims, 21 Drawing Sheets

(56) References Cited

U.S. PATENT DOCUMENTS

| | | | | |
|---|---|---|---|---|
| 5,701,236 | A * | 12/1997 | Viviano | F21S 4/20 256/65.02 |
| 6,439,744 | B1 * | 8/2002 | Chanslor | F21S 4/10 248/530 |
| 6,456,198 | B1 * | 9/2002 | Kato | G08B 13/122 256/48 |
| 6,581,335 | B2 * | 6/2003 | Grant | F21S 8/081 362/414 |
| 6,902,151 | B1 * | 6/2005 | Nilsson | E01F 15/06 256/13.1 |
| 6,962,328 | B2 * | 11/2005 | Bergendahl | E01F 15/06 404/6 |
| 7,188,826 | B1 * | 3/2007 | Gibbs | E04H 17/143 256/22 |
| 7,806,359 | B1 * | 10/2010 | Lillig | E04H 17/266 242/403 |
| 8,776,465 | B2 * | 7/2014 | Murphy | G08B 13/22 52/309.4 |
| 8,992,116 | B2 * | 3/2015 | Sloan | E04H 17/127 404/6 |
| 9,183,713 | B2 * | 11/2015 | Doyle | G08B 13/1436 |
| 11,111,694 | B2 * | 9/2021 | Nickelston | E01F 15/143 |
| 11,209,148 | B2 | 12/2021 | Beausoleil et al. | |
| 11,268,683 | B2 | 3/2022 | Beausoleil | |
| 11,362,446 | B2 * | 6/2022 | Cochrane | H01R 4/66 |
| 2007/0102689 | A1 * | 5/2007 | Alberson | E01F 15/06 256/13.1 |
| 2010/0061801 | A1 * | 3/2010 | Heald | E01F 9/669 404/10 |
| 2015/0300558 | A1 * | 10/2015 | Bishop | F16M 13/02 248/219.4 |
| 2021/0116115 | A1 * | 4/2021 | Beausoleil | F21V 33/006 |

\* cited by examiner

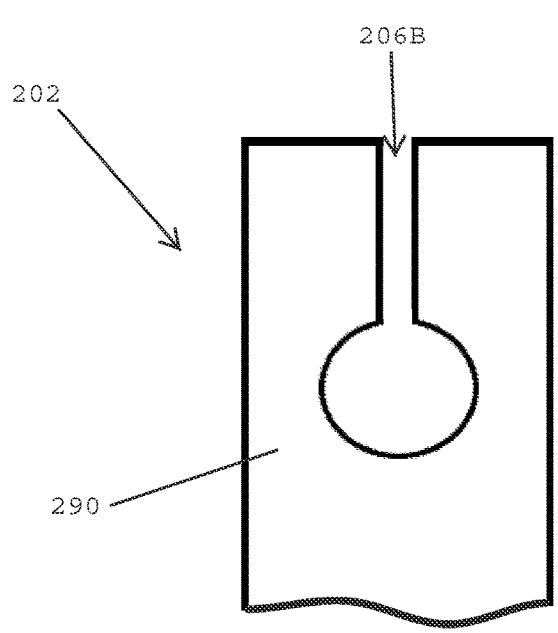
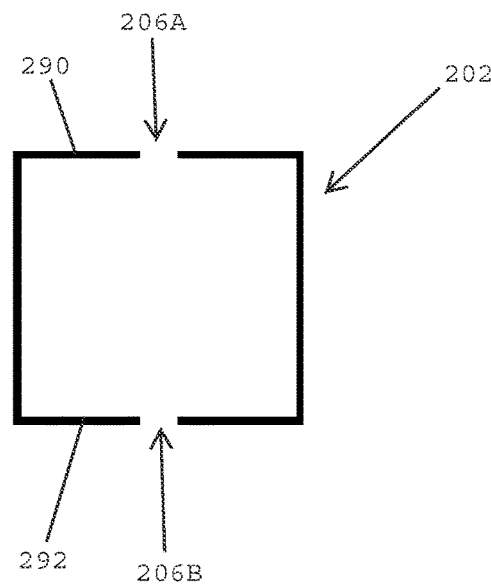
FIG. 17A  FIG. 17B
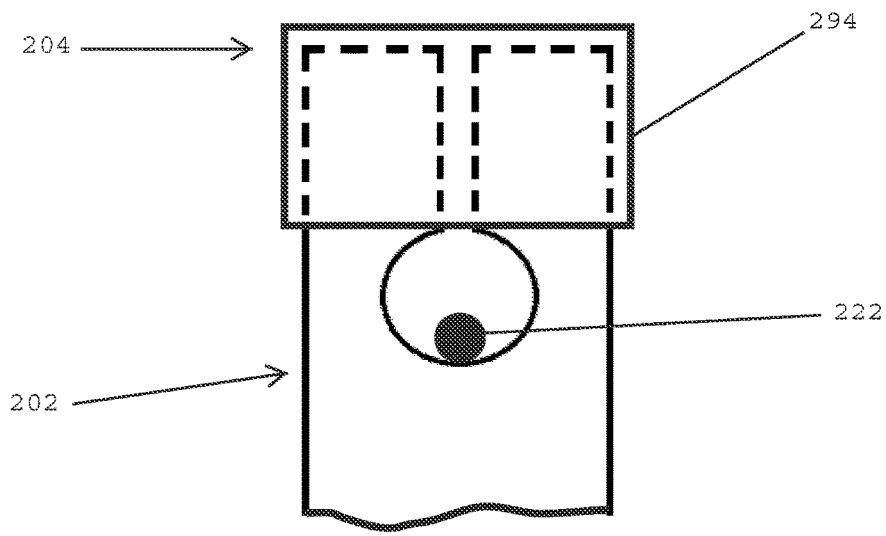
FIG. 18

SYSTEMS, DEVICES AND METHODS FOR FACILITATING THE INSTALLATION OF CONDUCTIVE WIRES AND DATA CABLES MOUNTED ON PERIMETER SECURITY FENCES

BACKGROUND OF THE INVENTION

Field of the Invention

The present patent application is generally related to perimeter security fences and is more particularly related to perimeter security fences that have security systems and devices such as security lights, infrared lights, security cameras, communications equipment, and sensors attached to the fence.

Description of the Related Art

Reliable and effective perimeter security fencing is critical for protecting highly secure locations including but not limited to military installations, data centers, electrical substations, airports, and nuclear power plants. Modern perimeter security fences often integrate security components for detecting and deterring intruders such as lasers, cameras, motion sensors, fiber optics, low voltage fence mounted perimeter security lighting, warning lights and other fence mounted security devices.

These advances in using intrusion detection and deterrence systems have increased the need for installing electrically conductive wires and/or data cables, which are coupled with security devices mounted on perimeter security fences. Significant benefits are attained by mounting electrically conductive wires and data cables directly to the perimeter security fences. The horizontally extending fence bars of a fence can perform a dual function of securing the chain link, fence fabric and/or slats to the fence, while also functioning as a wire tray for the wires and cables. Utilizing dual function horizontal fence bars affords significant savings to property owners by providing a means of securely encasing the conductive wires and/or data cables from damage, while also providing a cost effective way to provide power and data to the security devices that are typically mounted to perimeter security fences. Other advantages that accrue to the owner by securing the electrically conductive wires and/or data cables within the horizontally extending fence bars include eliminating the need to physically trench the ground to install the wires, cables, conduit and pull boxes required to both power the security devices and provide a data network that delivers video, data or signals to security guards. In view of the fact that perimeter security fences can extend for miles, eliminating the added expenses associated with burying conduit and the cost of materials can result in a significant price savings. Additionally, not having to dig into the ground to install conduit systems along fence lines prevents possible damage to power lines, cables, water lines, gas lines and/or other underground utilities.

Referring to FIGS. 1-4, a prior art perimeter security fence 30 includes vertical fence posts 32 that are spaced from one another along a fence line, horizontally extending fence bars 34A, 34B that are secured to and extend between the vertical fence posts 32, and vertical slats 36 that are secured to the horizontally extending fence bars 34. The perimeter security fence 30 includes wire holes 38 located at the upper ends of the respective vertical fence posts 32 for enabling electrically conductive wires and/or data cables to be passed through the bodies of the respective vertical fence posts 32. The electrically conductive wires and/or data cables are disposed within wire trays 40 that are secured to and extend between the vertical fence posts 32. Each wire tray 40 has an elongated conduit 42 that extends along the length of the wire tray and that is adapted to receive one or more conductive wires and/or data cables. When mounted to the vertical fence posts 32, the elongated conduit 42 of the wire tray 40 is aligned with the wire holes 38 (FIG. 3) formed in the respective vertical fence posts 32.

When installing conductive wires and/or data cables, the conductive wires and/or data cables are passed through the wire holes 38 in the series of vertical fence posts 32. It is very difficult for installers to pull/run larger wires and/or data cables over a long length of the perimeter security fence without splicing the wires/cables in sections along the length of the fence line. Moreover, when pulling the wires/cables through the wire holes 38 (FIG. 3) formed in the respective vertical fence posts 32, the outer insulation and/or outer cladding may become damaged for exposing the inner conductive material, which can cause shorts and problems with the integrity of a wiring system or the data cables. In addition, many perimeter security fences have sharp turns (e.g., ninety degree turns) and changing elevation, which also makes it difficult and time consuming to pull and/or run conductive wires and/or data cables through the wire holes 38 provided in the vertical fence posts 32.

Referring to FIGS. 3 and 4, as noted above, wire trays 40 are often used for protecting the conductive wires and/or data cables that are installed on the perimeter security fence 30. As noted above, in many instances, it is extremely time consuming and/or labor intensive to pass and/or pull conductive wires and data cables through the wire trays 40 and the aligned wire holes 38 formed in the vertical fence posts 32. The conventional design shown in FIGS. 1-4 requires the conductive wires and data cables to be pulled through wire holes along the entire length of the fence. This task becomes even more difficult for fences having lengthy wire runs, turns (e.g., ninety degree bends), and changing elevations.

In view of the above-noted deficiencies, there remains a need for improved perimeter security fences having structural features that simplify and reduce the amount of time required to install conductive wires and/or data cables on the fences. There also remains a need for improved systems, devices and methods for rapidly installing electrically conductive wires and/or data cables on perimeter security fences while minimizing the likelihood that the conductive wires and/or data cables will be damaged during installation.

SUMMARY OF THE INVENTION

In one embodiment, a perimeter security fence preferably includes a plurality of vertical fence posts that are spaced from one another along a fence line of the perimeter security fence, each vertical fence post having an upper end and a lower end.

In one embodiment, a wire receiving slot is formed in each vertical fence post. In one embodiment, each wire receiving slot has an open, upper end and a closed, lower end.

In one embodiment, one or more conductive wires or cables are disposed within the wire receiving slots of the vertical fence posts.

In one embodiment, at least one reinforcing plate is secured to each vertical fence post for covering a gap in the vertical fence post defined by the wire receiving slot.

The at least one reinforcing plate is configured to enhance the structural integrity of the vertical fence post in the vicinity of the wire receiving slot and retain the one or more conductive wires or cables within the wire receiving slot.

In one embodiment, one or more security devices may be secured to the perimeter security fence. The one or more security devices are preferably coupled with the one or more conductive wires or cables disposed within the wire receiving slots of the vertical fence posts.

In one embodiment, an extension arm is secured to one of said reinforcing plates.

In one embodiment, an extension arm that is secured to a reinforcing plate preferably projects above the top or upper end of the perimeter security fence.

In one embodiment, one of the security devices may be attached to the extension arm that is attached to a reinforcing plate and that projects above the top of the perimeter security fence.

In one embodiment, the one or more conductive wires or cables disposed within the wire receiving slots of the vertical fence posts extend along the fence line of the perimeter security fence.

In one embodiment, each vertical fence post desirably includes an elongated body having an I-beam shape including first and second flanges and a web that interconnects the first and second flanges.

In one embodiment, the first and second flanges and the web have respective lengths that extend between the upper and lower ends of the vertical fence post.

In one embodiment, the wire receiving slots are formed in upper ends of the webs and extend toward lower ends of the webs of the respective vertical fence posts.

In one embodiment, each wire receiving slot has an upper section defining a width and a lower section including a wire receiving channel defining an outer diameter that is greater than the width of the upper section of the wire receiving slot.

In one embodiment, the at least one reinforcing plate that is secured to the vertical fence post may include a first reinforcing plate engaging a first major surface of the web and a second reinforcing plate engaging a second major surface of the web, the first and second reinforcing plates being aligned with one another.

In one embodiment, at least one fastener interconnects the first and second reinforcing plates.

In one embodiment, the first reinforcing plate has at least one fastener opening, and the second reinforcing plate has at least one fastener opening that is aligned with the at least one fastener opening of the first reinforcing plate.

In one embodiment, the at least one fastener passes through the aligned fastener openings of the first and second reinforcing plates.

In one embodiment, the one or more security devices secured to the perimeter security fence may include one or more security light fixtures secured to the perimeter security fence.

In one embodiment, each of the security light fixtures is secured to one of the vertical fence posts.

In one embodiment, the one or more security devices may be low voltage security lights, alarms, lasers, cameras, motion sensors, fiber optics, and/or warning lights In one embodiment, each wire receiving slot has an open upper end that is located at the upper end of the vertical fence post and a closed lower end.

In one embodiment, each wire receiving slot has an upper section defining a first width and a lower section including a wire receiving channel that defines a second width that is greater than the first width of the upper section of the wire receiving slot.

In one embodiment, a perimeter security fence preferably includes at least one vertical fence post having an upper end and a lower end, and a wire receiving slot formed in an upper section of the at least one vertical fence post, the wire receiving slot having an open, upper end and a closed, lower end.

In one embodiment, the perimeter security fence may include a reinforcing plate secured to the upper section of the at least one vertical fence post and overlying the wire receiving slot for enhancing the structural integrity of the upper section of the at least one vertical fence post that contains the wire receiving slot.

In one embodiment, one or more conductive wires or cables may be disposed within the wire receiving slot of the at least one vertical fence post.

In one embodiment, the reinforcing plate preferably retains the one or more conductive wires or cables within the wire receiving slot.

In one embodiment, one or more security devices may be secured to the perimeter security fence. The one or more security devices may be coupled with the one or more conductive wires or cables disposed within the wire receiving slot of the at least one vertical fence post.

In one embodiment, at least one vertical fence post has an I-beam shape including first and second flanges and a web extending between the first and second flanges. In one embodiment, the wire receiving slot is formed in an upper end of the web.

In one embodiment, the web of at least one vertical fence post has a first major face and a second major face, and the wire receiving slot extends from the first major face to the second major face of the web.

In one embodiment, the retaining plate overlies the first major face of the web, and a second retaining plate overlies the second major face of the web.

In one embodiment, a perimeter security fence preferably includes a plurality of vertical fence posts spaced from one another along a fence line of a perimeter security fence, each vertical fence post having an upper end and a lower end.

In one embodiment, a wire receiving slot is formed in an upper end of each vertical fence post.

In one embodiment, one or more conductive wires or cables may be disposed within the wire receiving slots of the vertical fence posts.

In one embodiment, the one or more conductive wires or cables may extend along the fence line of the perimeter security fence.

In one embodiment, at least one reinforcing plate is secured to each vertical fence post for covering at least a portion of the wire receiving slot to enhance the structural integrity of the vertical fence post in the vicinity of the wire receiving slot and to retain the one or more conductive wires or cables within the wire receiving slot.

In one embodiment, one or more security devices may be secured to the perimeter security fence and are coupled with the one or more conductive wires or cables disposed within the wire receiving slots of the vertical fence posts.

In one embodiment, each vertical fence post may include an elongated body having an I-beam shape including first and second flanges and a web that interconnects the first and second flanges, whereby the first and second flanges and the web have respective lengths that extend between the upper and lower ends of the vertical fence post.

In one embodiment, the wire receiving slots are formed in upper ends of the webs and extend toward lower ends of the webs of the respective vertical fence posts.

In one embodiment, one or more wire receiving slots may include an upper section defining a width and a lower section including a wire receiving channel defining an outer diameter that is greater than the width of the upper section of the wire receiving slot.

In one embodiment, the at least one reinforcing plate that is secured to the vertical fence post may include a first reinforcing plate engaging a first major surface of the web, a second reinforcing plate engaging a second major surface of the web that is aligned with the first reinforcing plate, and at least one fastener interconnecting the first and second reinforcing plates.

In one embodiment, a fence post for a perimeter security fence has an I beam shape and a wire receiving slot formed at a center and top of the I beam, which provides an installer with easy access to the wire receiving slot from the top of the fence post. In one embodiment, an installer may remove a reinforcing plate from the fence post to expose an open end of the wire receiving slot. After one or more conductive wires or cables are installed in the wire receiving opening, the reinforcing plate may be re-secured to the fence post.

In one embodiment, the reinforcing plate (e.g., a bracket) preferably ensures the structural integrity and strength to the upright fence post. Moreover, the configuration of the wire receiving slot enables the one or more conductive wires or cables to be laid into the series of wire receiving slots instead of pulling the wires or cables through wire holes (e.g., the wire hole 38 in the prior art fence post 32 shown in FIG. 3), which prevents possible chafing and/or damage to the low voltage wire insulation or cable cladding, which could cause the wires or cables to malfunction and compromise the integrity of the security system.

In one embodiment, the design of the vertical fence posts disclosed herein enable an installer to simply remove one or more reinforcing plates to access the wire receiving channel, preferably located at the top section of the fence post, which exposes a wire receiving slot or wire channel to allow the installer to simply drop/lay the wires or cables into the fence post. The wire receiving channels eliminate the need to pull wire or cable through wire holes (e.g., element 38 in FIG. 3), which could cause damage to the wires or cables.

In one embodiment, an installer may drive a vehicle along a fence line while de-spooling a large wire or cable roll for easily and/or rapidly placing the wire/cable in the respective wire receiving slots of the vertical fence posts. The method of installing wires or cables on a perimeter security fence disclosed herein will dramatically decrease the amount of labor required to install wire along a perimeter security fence by 70-80%, and will eliminate the time required to pull and/or snake wire or cables through the wire holes that are provided in prior art fence posts.

In one embodiment, once the wires or cables are placed into the wire receiving slots, an installer simply reattaches the reinforcing plates to the upper ends of the fence posts. The reinforcing plates provide added strength to the vertical fence post.

In one embodiment, one or more reinforcing plates may be designed to accommodate the attachment of security devices such as cameras, pipes, mounting hardware, etc., which is customized to the security application.

In one embodiment, a fence post may include a slot that extends from the top of the fence post to a wire through hole formed in an upper section of the fence post.

In one embodiment, a wire access slot may be provided in the back of the I beam section of a vertical fence post and not down the center web of the fence post to provide a path for placing wire or cable in the fence post wire through hole.

A removable wire access metal plate may be provided to seal off the wire access slot, provide strength to the fence section, and additionally allow for attachment of mounting brackets of security devices such as cameras, lights, transmitters, etc.

These and other preferred embodiments of the present patent application will be described in more detail herein.

BRIEF DESCRIPTION OF THE DRAWINGS

FIG. 17A is a side elevation view of an upper end of a vertical fence post having first and second wire receiving slots formed in opposing outer walls of the vertical fence post, in accordance with one embodiment of the present patent application.

FIG. 17B is a top view of the vertical fence post shown in FIG. 17A.

FIG. 18 is a side elevation view of the vertical fence post shown in FIG. 17A with a reinforcing cap secured over an upper end of the vertical fence post for reinforcing the structural integrity of the upper end of the fence post and retaining a conductive wire within a wire receiving channel, in accordance with one embodiment of the present patent application.

DETAILED DESCRIPTION OF PREFERRED EMBODIMENTS

Figure 1:
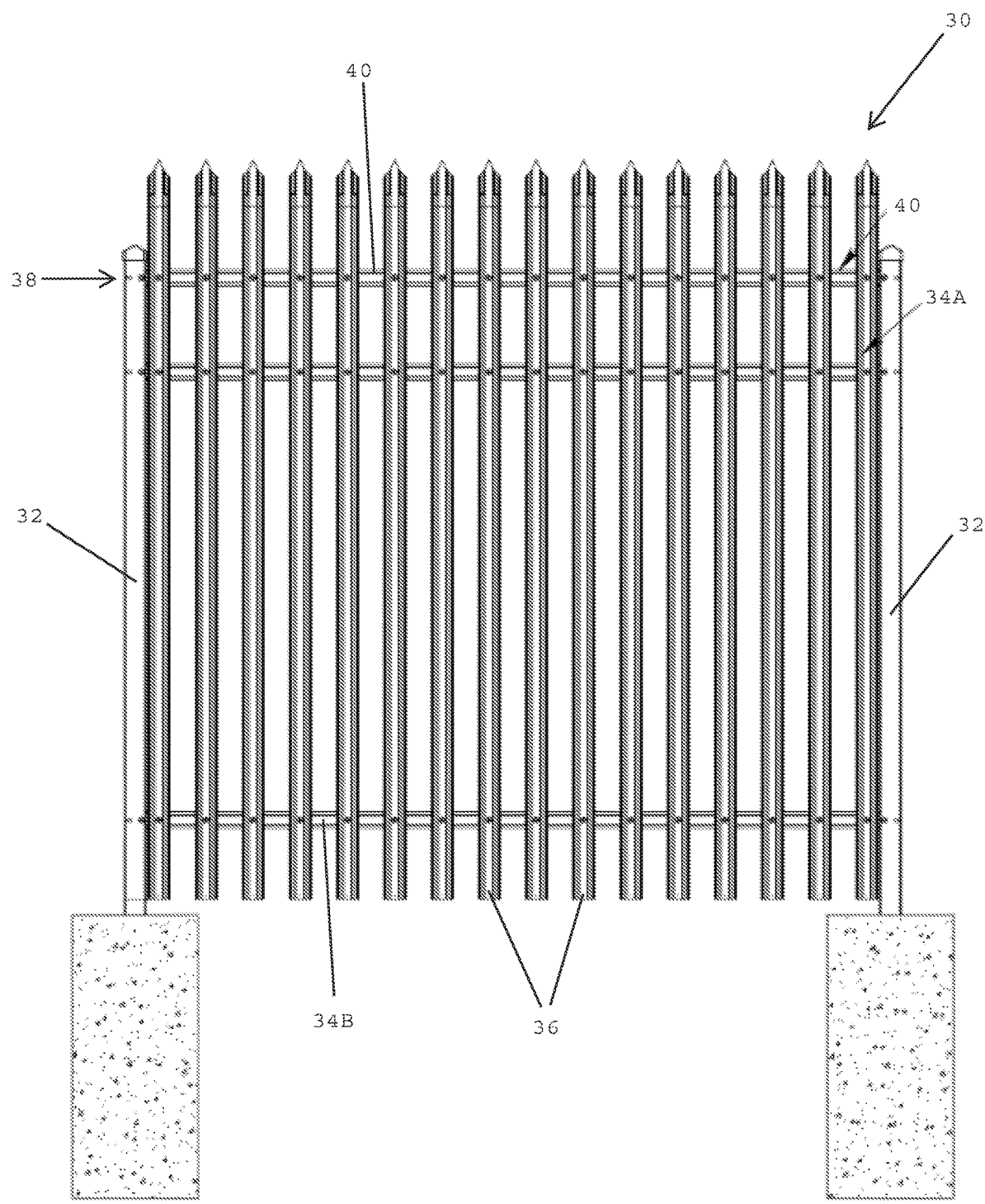
FIG. 1 is a front elevation view of a section of a prior art perimeter security fence including vertical fence posts, horizontal fence bars extending between the vertical fence posts, and vertical slats secured to the horizontal fence bars.
Figure 2:
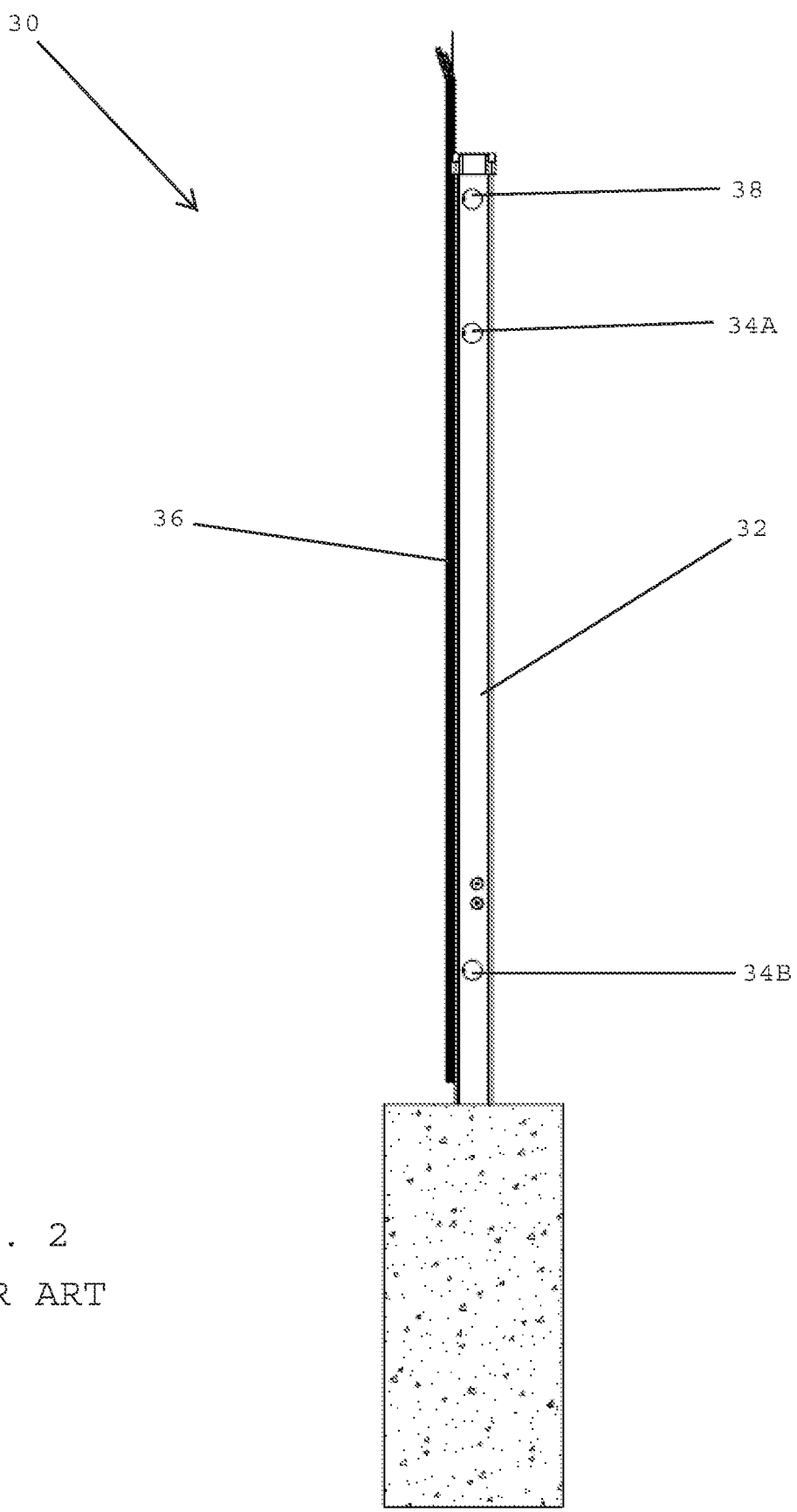
FIG. 2 is a side view of the section of the prior art perimeter security fence shown in FIG. 1.
Figure 3:
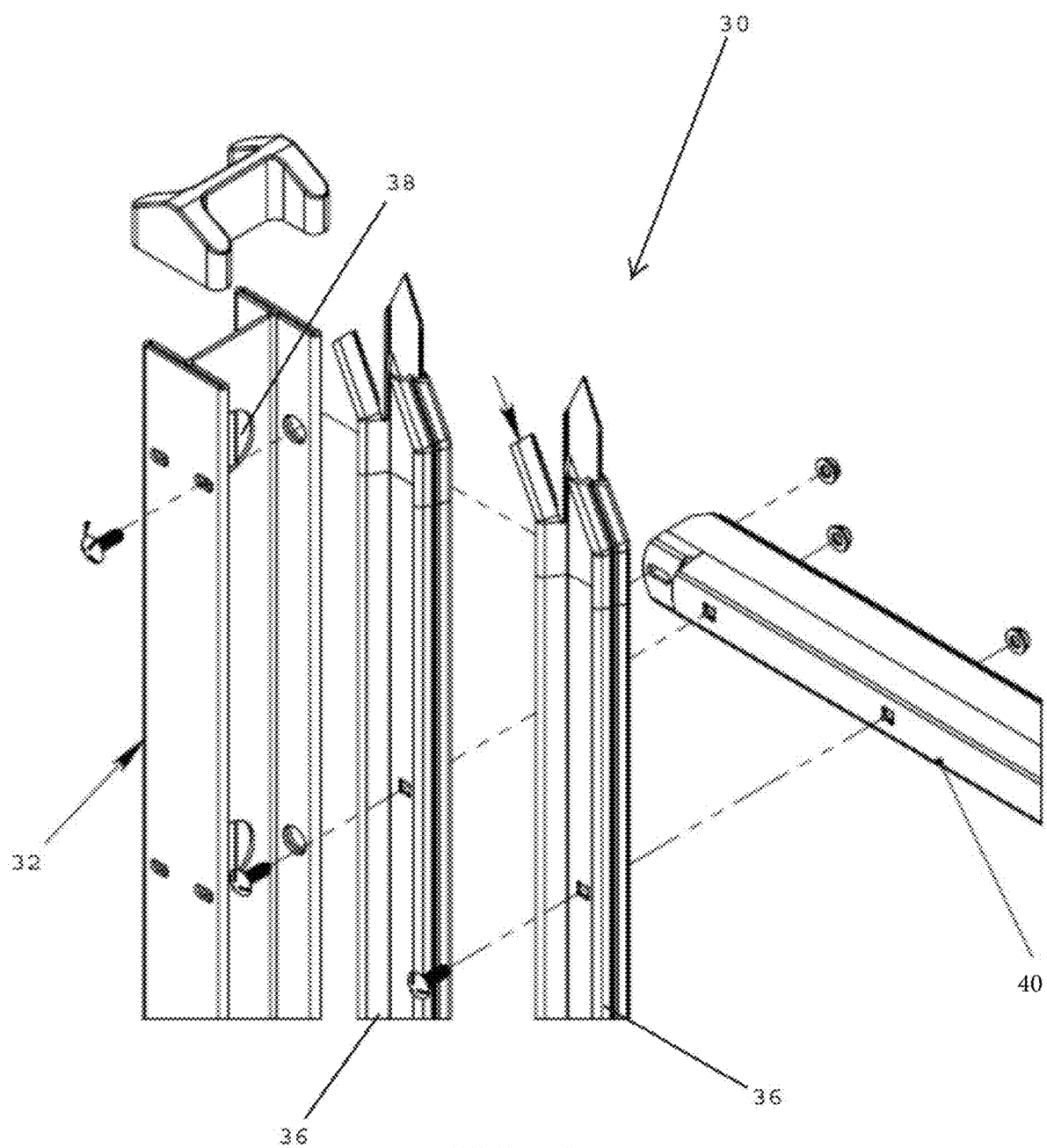
FIG. 3 is a partially exploded view of an upper end of a section of the prior art perimeter security fence shown in FIGS. 1 and 2.
Figure 4:
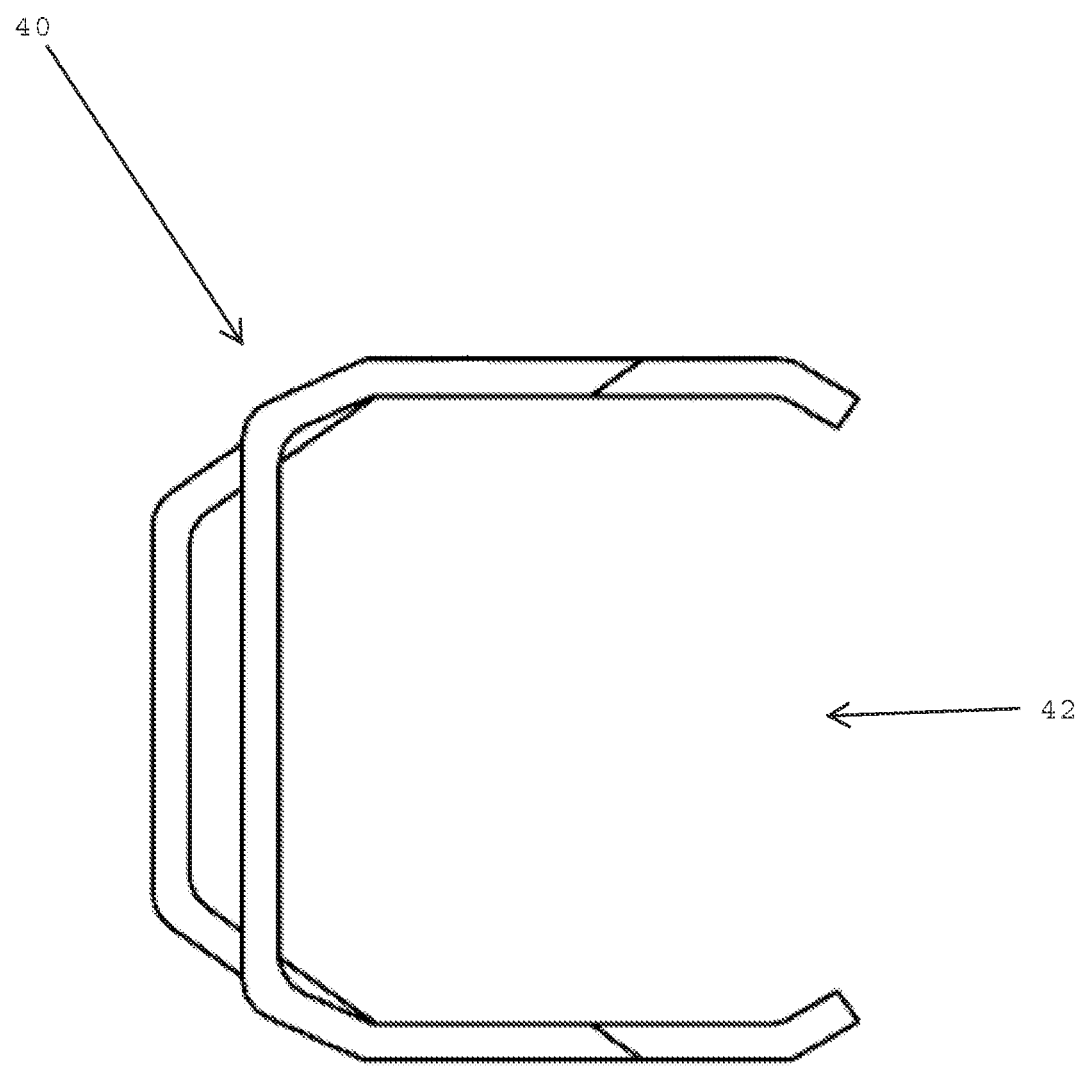
FIG. 4 is a cross-sectional view of a wire tray of the prior art perimeter security fence shown in FIGS. 1-3, the wire tray being designed to contain wires and cables that are installed on the perimeter security fence.
Figure 5:
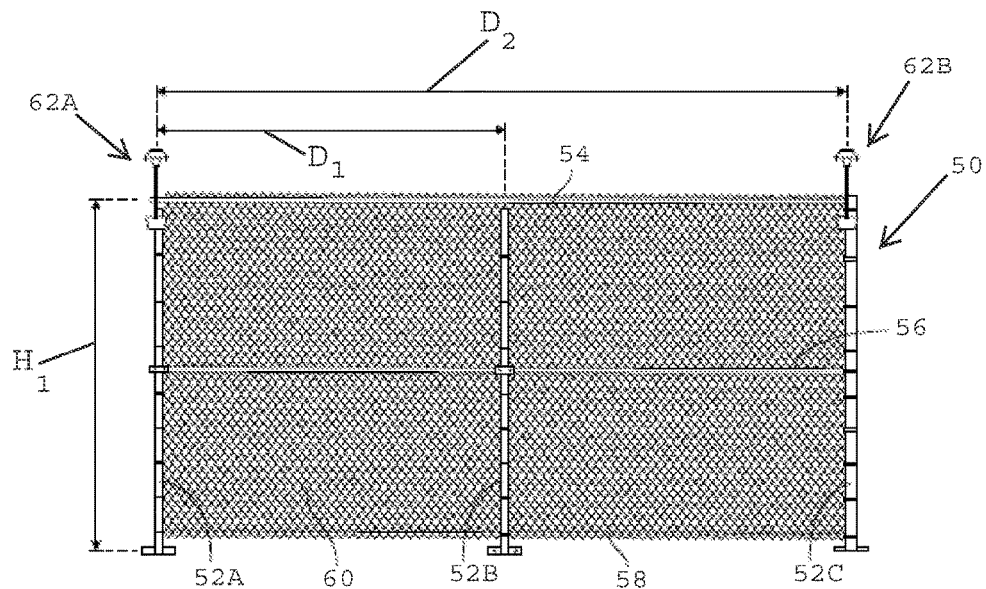
FIG. 5 is a front elevation view of a section of a perimeter security fence having security lighting mounted to vertical fence posts, in accordance with one embodiment of the present patent application.

Referring to FIG. 5, in one embodiment, a perimeter security fence 50 includes a security lighting system as disclosed in U.S. Pat. No. 11,209,148, assigned to Mind Head LLC of Ridgewood, New Jersey, the disclosure of which is hereby incorporated by reference herein. In one embodiment, the perimeter security fence 50 preferably includes vertical fence posts 52A, 52B and 52C, a top horizontal fence bar 54, a middle horizontal fence bar 56, and a bottom horizontal fence bar 58. The perimeter security fence 50 also desirably includes chain link 60 that is secured to the vertical fence posts 52A-52C and the horizontally extending fence bars 54, 56, 58.

In one embodiment, each vertical fence post 52A-52C has a height designated $H_1$. In one embodiment, the vertical fence posts 52A-52C have a fence post spacing designated $D_1$. The perimeter security fence 50 preferably has security lights 62A, 62B, such as the low voltage security lights, which are mounted to every other vertical fence post 52. The distance between the adjacent security lights 62 preferably defines a security light spacing distance designated $D_2$.

In one embodiment, each of the security lights 62 is mounted on one of the vertical fence posts 52. In one embodiment, the security lights may be mounted at the top or upper end of the vertical fence posts. The spacing between the adjacent security lights is dependent upon the particular security and/or illumination requirements. The level of illuminance produced by the security lighting system is dependent upon 1) the spacing between adjacent security lights, and 2) the height $H_1$ of the perimeter security fence 50.

In one embodiment, the security lighting system is designed to provide low-glare, low-level illuminance for long fence lines. In one embodiment, the security lighting system preferably utilizes low voltage security lights having LED lights, which maximizes energy efficiency and eliminates disabling glare for guards and cameras while providing sufficient illumination for intruder and vandal detection. The low-glare, low-level illuminance provides a number of advantages including minimal contrast and no disabling glare. Regarding minimal contrast, when lit areas and un-lit areas are near in illuminance values, intruders are more easily detected when moving between the two areas. Guards and cameras are able to readily adjust vision or exposure between the lit and un-lit areas. Regarding no disabling glare, overly bright or direct light sources temporarily blind guards and, for cameras, cause internal reflections and inappropriate exposure compensation. The low-glare lighting provided by the security lighting system disclosed herein is ideal for detection.

Figure 6:
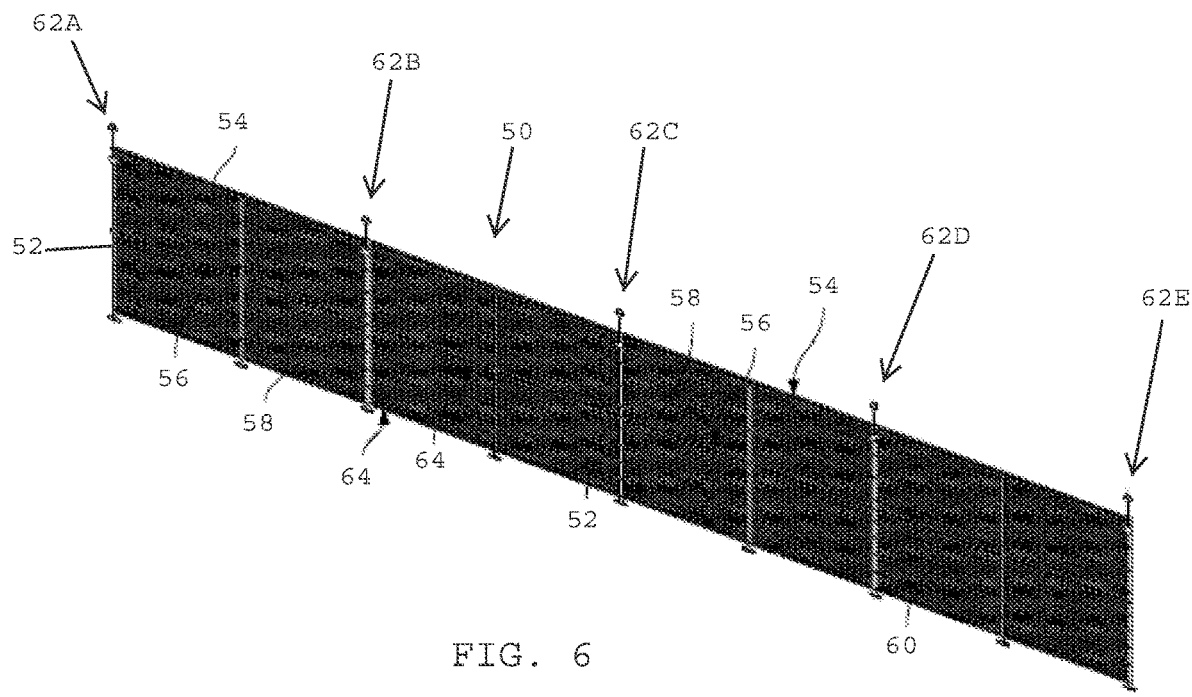
FIG. 6 is a perspective view of a larger section of the perimeter security fence shown in FIG. 5.

Referring to FIG. 6, in one embodiment, the security lighting system is preferably mounted to the perimeter security fence 50. Electrically conductive wiring is preferably used to provide power to the security lights 62A-62E mounted on the fence. In one embodiment, the electrically conductive wiring may be low voltage wiring that is weatherproof and/or UV-rated. In one embodiment, the electrically conductive wiring may be attached directly to the security devices installed on the perimeter security fence 50 without the use of conduit. The low voltage electrically conductive wires may be attached directly to the fence using fasteners such as permanent or removable cable ties. The electrically conductive wires may be strung along the top horizontal fence bar 54, the middle horizontal fence bar 56, or the bottom horizontal fence bar 58 to reach the location of the security lights 62A-62E. The electrically conductive wiring may be attached directly to the horizontal fence bars, which provides a system that is relatively safe from vandals since it is difficult to reach through the chain link 60 to attack (e.g., cut; damage) the conductive wires.

In higher-security applications, conduit 64 may be used for protecting the electrically conductive wire from vandals and/or the weather. The conduit 64 may be PVC (e.g., ½" inch PVC) or metal conduit. The conduit 64 may be strung along one of the horizontal fence bars such as the middle horizontal fence bar 56 or the bottom horizontal fence bar 58. A junction box of a security light is preferably mounted onto a vertical fence post 52 and a vertically extending conduit connects the electrically conductive wiring within the horizontally extending conduit 64 to the junction box.

Figure 7:
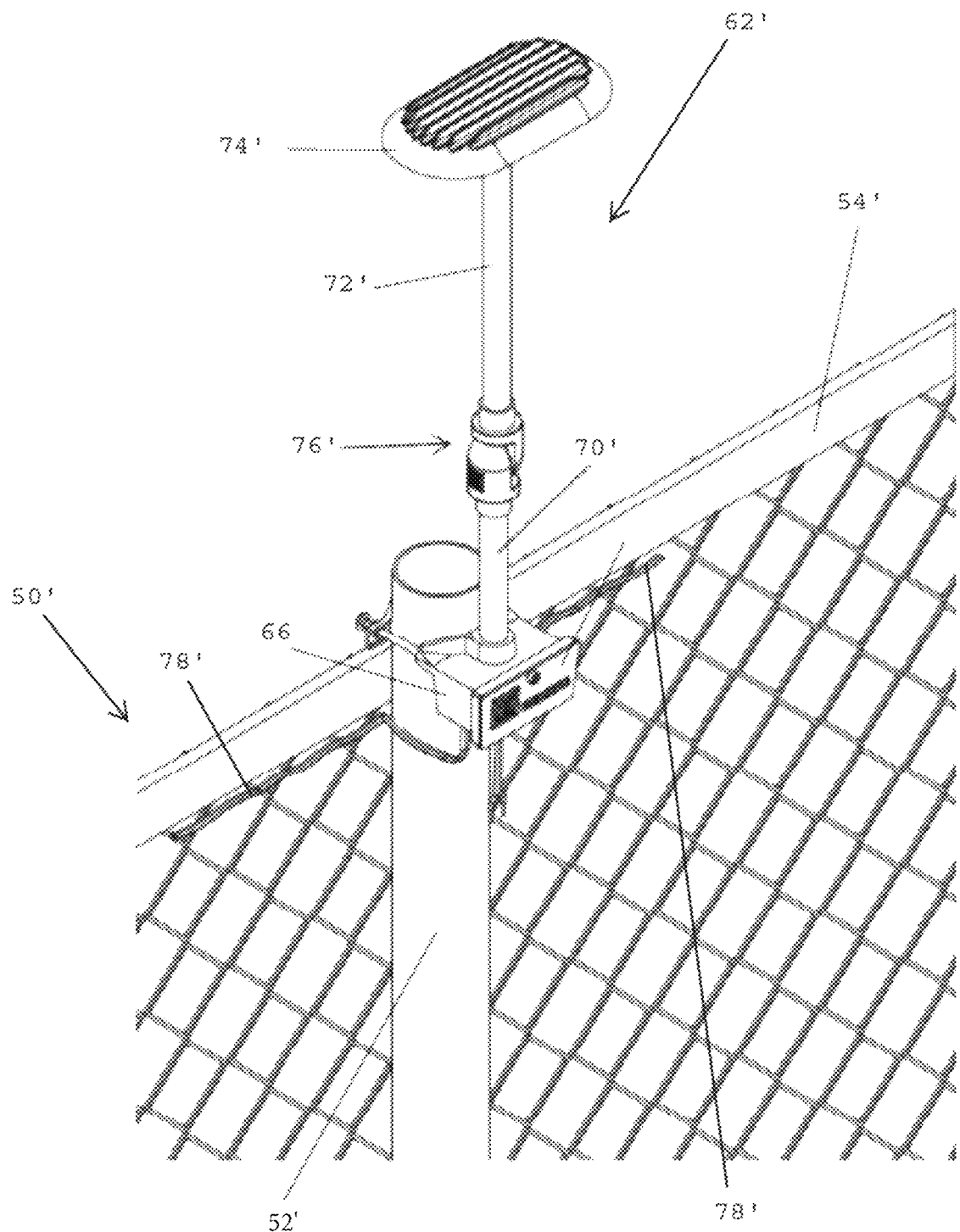
FIG. 7 is a magnified view of a section of a perimeter security fence having a security light mounted to a vertical fence post, in accordance with one embodiment of the present patent application.

Referring to FIG. 7, in one embodiment, a security lighting system for a perimeter security fence 50' may be similar to that disclosed in U.S. Patent Application No. 11,268,683, assigned to Mind Head LLC of Ridgewood, New Jersey, the disclosure of which is hereby incorporated by reference herein. In one embodiment, the perimeter security fence 50' preferably includes a security lighting fixture 62' mounted atop a vertical fence post 52' of the perimeter security fence 50'. The security lighting fixture 62' desirably has a lower end that is mounted onto the vertical fence post 52' of the perimeter security fence 50'. The lower end of the security lighting fixture 62' preferably includes a junction box 66' that is adapted to contain electrical components and circuitry for providing power to the security lighting fixture and controlling operation of the security lighting fixture. The lower end of the security lighting fixture 62' preferably includes a front cover 68' that covers the front of the junction box 66'. The front cover 68' may be removed for accessing an opening at the front of the junction box 66'.

In one embodiment, the security lighting fixture 62' preferably includes a lower pipe section 70' that extends upwardly from the junction box 66'. The lower pipe section extends vertically away from a top surface of the junction box. The security lighting fixture preferably includes an upper pipe section 72' that is located between the lower pipe section 70' and a glare shield 74' that defines an upper end of the security lighting fixture.

In one embodiment, the security lighting fixture 62' may include an articulating knuckle 76' or joint that couples an upper end of the lower pipe section 70' with a lower end of the upper pipe section 72'. The articulating knuckle 76' enables an on-site installer to change the angle of the upper pipe section relative to the lower pipe section to accommodate for grade changes in the landscape topography in order to align the beam angle of the light generated by the security lighting fixture 62' to better suit the existing grade conditions and/or topography that surrounds the perimeter fence.

In many instances, perimeter fences are installed on hillsides with the vertical fence posts installed perfectly level and true at a ninety degree angle when the grade is running up or down hill. In some instances, a perimeter security fence may be positioned on a flat grade with the grade on the outside of the perimeter fence going uphill or downhill. By providing an articulating knuckle 76' or articulating joint, the security lighting fixture 62' disclosed in FIG. 7 enables an installer to adjust the orientation of the upper pipe section 72' so that the optics on the underside of the glare shield 74' may be aligned with the existing on-site grade conditions. The articulating knuckle 76' allows for 360 degree rotation of the glare shroud 74' and angulation adjustment left to right from true 0 degrees to ninety (90) degrees both inside and outside the perimeter fence 50'. This adjustability allows the installer to fine tune the orientation of the light pattern emanating from the security lighting fixture so that the light pattern is aligned with the existing grade for fully illuminating the land surface with the beam angle of which the security lighting fixture was designed for. Without the adjustability capability, the light generated by the light fixture may be too bright in some areas and not bright enough in other areas. The lack of adjustability may also cause direct glare to security personnel located in the vicinity of a security light fixture.

In one embodiment, the articulating knuckle 76', positioned between the lower and upper pipe sections 70', 72', enables for very slight and/or minuscule angular lighting adjustments within an adjustment range. Should a situation arise whereby light is required to shine on a wall or other vertical surface, the upper pipe section 72' and the glare shield 74' may be easily rotated a full ninety degrees. This capability allows a light fixture to be attached to a lower pipe section 70' that is not ninety degrees plumb to grade, and allows the installer the ability to make slight adjustments so that the security lighting fixture is mounted ninety degrees to grade located at the lower end of the vertical fence post 52'. In one embodiment, low voltage electrically conductive wire 78' interconnects the security lights 62'.

In addition to security lights, in one or more embodiments of the present patent application, the perimeter security fences shown and described above in FIGS. 5-7 may have other security devices mounted thereon including but not limited to lasers, cameras, motion sensors, fiber optics, low voltage fence mounted perimeter security lighting, warning lights and other fence mounted security devices. In certain preferred embodiments, one or more electrically conductive wires (e.g., low voltage conductive wires) and/or one or more data or communications cables may be installed on the perimeter security fence for being coupled with the various security devices mounted on the fence.

Figure 8:
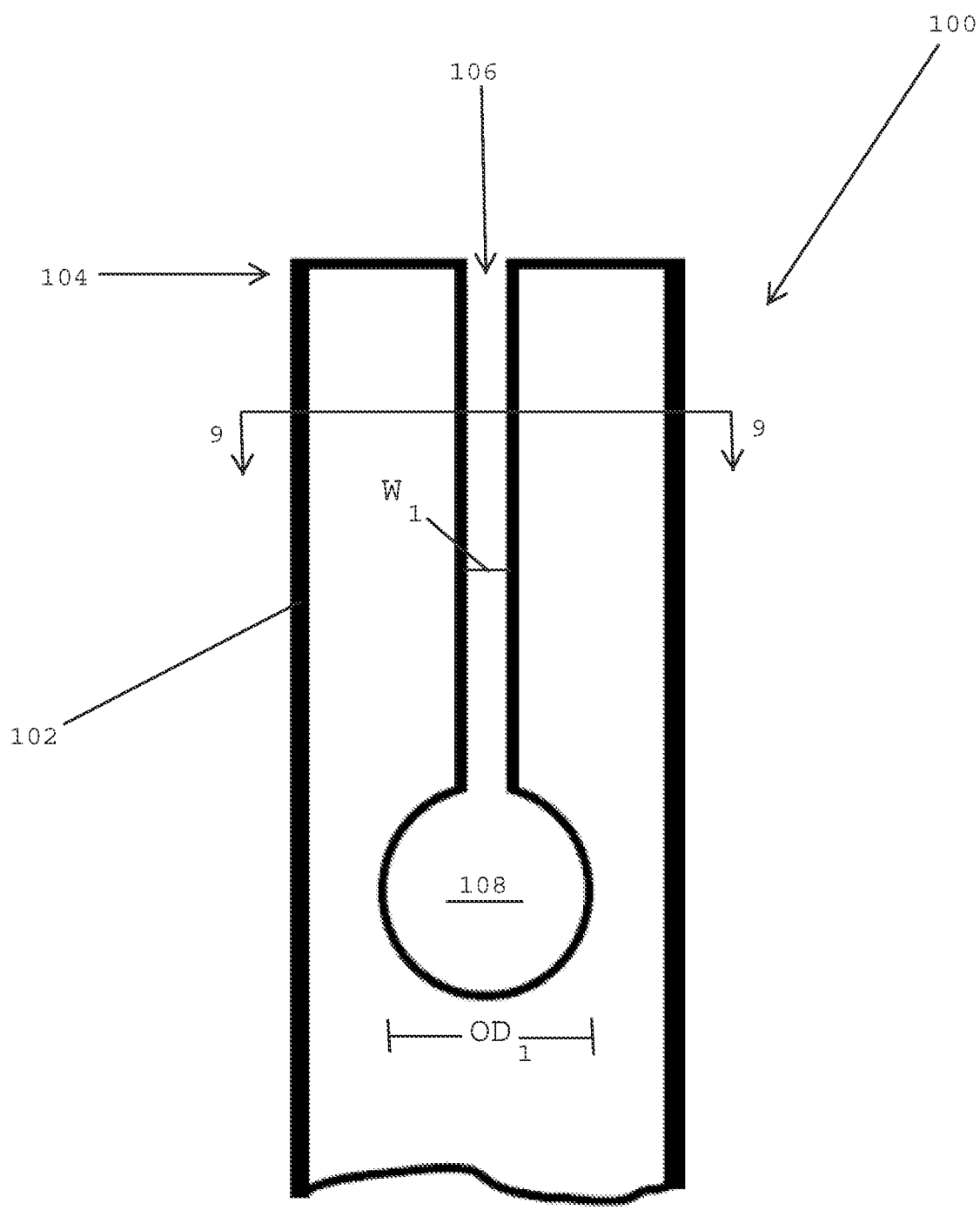
FIG. 8 is a side view of an upper end of a vertical fence post of a perimeter security fence, the vertical fence post including a wire receiving slot formed in an upper end of the vertical fence post for installing conductive wires or data cables on the perimeter security fence, in accordance with one embodiment of the present patent application.

Referring to FIG. 8, in one embodiment, a perimeter security fence 100, such as one of the perimeter security fences shown and described above in FIGS. 5-7, preferably includes a plurality of vertical fence posts that are spaced from one another along a fence line. In one embodiment, a vertical fence post 102 preferably has a lower end (not shown) that extends toward the ground and an upper end 104 having a wire receiving slot 106 formed therein. In one embodiment, the wire receiving slot 106 preferably has a width $W_1$. In one embodiment, the wire receiving slot 106 is open at the upper end 104 of the vertical fence post 102 and closed at a lower end.

In one embodiment, one or more conductive wires and/or data/communication cables may be passed through the open, upper end of the wire receiving slot 106 for securing the one or more conductive wires and/or data/communication cables within the wire receiving slot 106. In one embodiment, the lower end of the wire receiving slot 106 is closed and preferably includes a wire receiving channel 108 having an outer diameter $OD_1$ that is greater than the width $W_1$ of the upper end of the wire receiving slot 106.

As will be described in more detail herein, the wire receiving slot 106 is configured for enabling one or more elongated, electrically conductive wires and/or data/communication cables to be passed through the opening at the upper end of the wire receiving slot 106 for being seated within the wire receiving channel 108 that closes the lower end of the wire receiving slot. In one embodiment, the wire receiving channel 108 preferably has a larger size than the width W1 of the upper section of the wire receiving slot 106 to accommodate a plurality of wires and/or cables that are installed on the vertical fence post 102.

Figure 9:
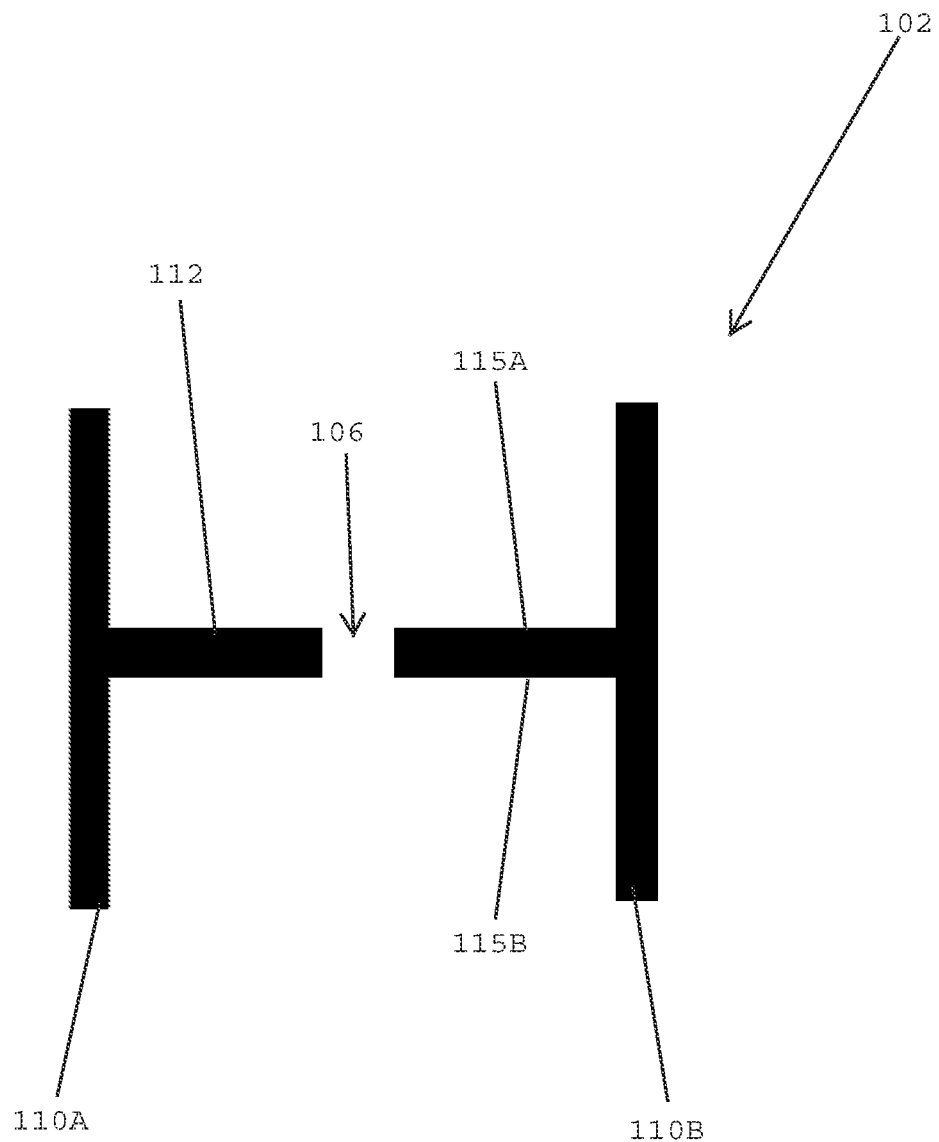
FIG. 9 is a top view of the vertical fence post shown in FIG. 8, the vertical fence post including the wire receiving slot formed in the upper end of the vertical fence post.

Referring to FIG. 9, in one embodiment, the vertical fence post 102 preferably has an I-beam shaped configuration including first and second flanges 110A, 110B and a web 112 that interconnects the first and second flanges 110A, 110B. In one embodiment, the wire receiving slot 106 is preferably formed in the upper end of the web 112 and extends part of the way toward the lower end of the vertical fence post 102. In one embodiment, a perimeter security fence may include a plurality of the vertical fence posts 102 shown in FIG. 9, whereby the vertical fence posts are spaced from one another along a fence line of the perimeter security fence. One or more conductive wires and/or one or more data cables may be installed in the wire receiving slots 106 of each of the vertical fence posts 102.

Figure 10:
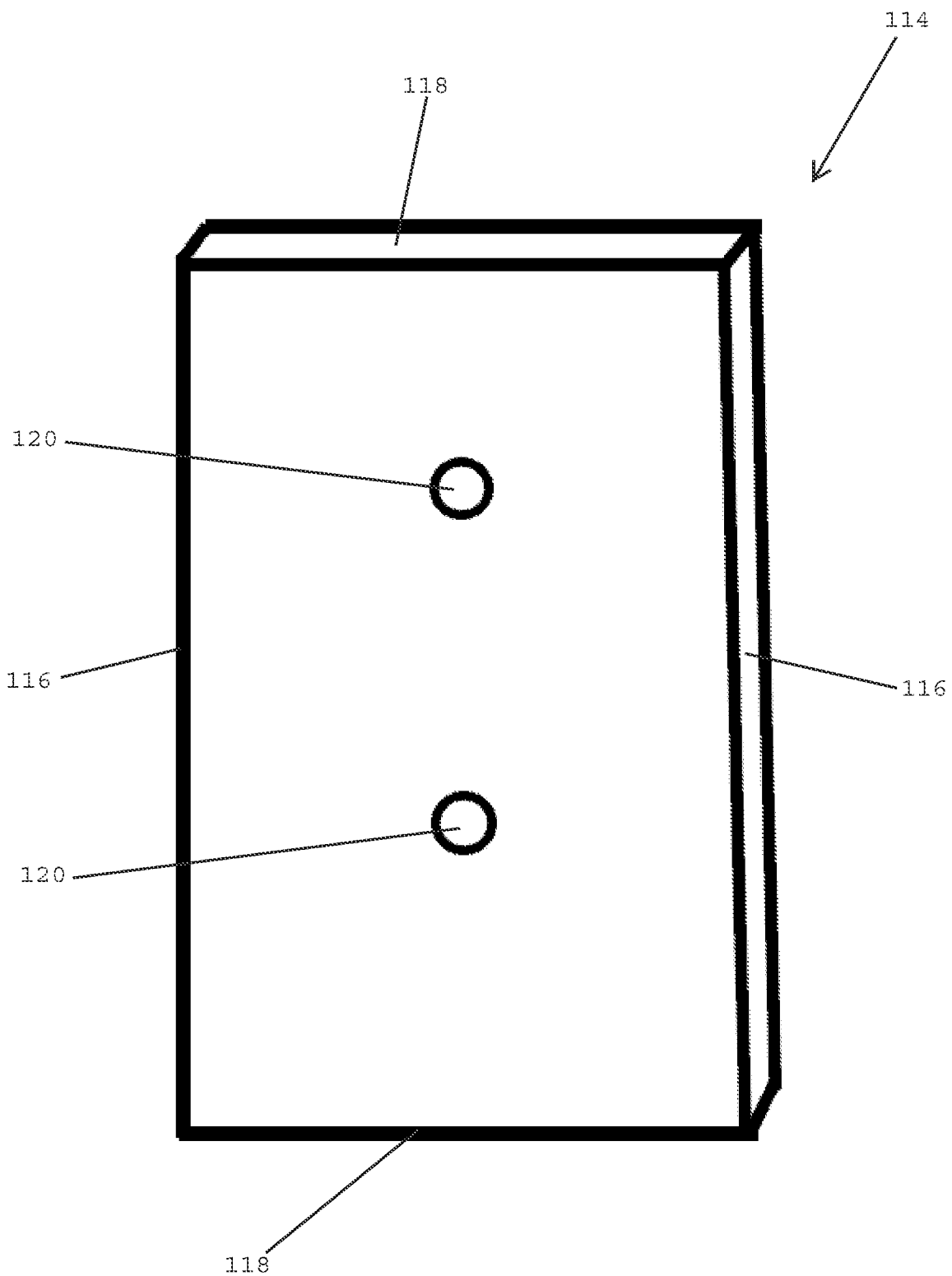
FIG. 10 is a perspective view of a reinforcing plate that is securable to an upper end of a vertical fence post of a perimeter security fence, in accordance with one embodiment of the present patent application.

Referring to FIGS. 9 and 10, in one embodiment, a perimeter security fence preferably includes one or more reinforcing plates 114 that are adapted to reinforce the structural integrity of the upper end of the vertical fence post 102 shown and described in FIGS. 8 and 9. In one embodiment, the reinforcing plate 114 may have a rectangular shape including longer sides 116 and shorter sides 118. In one embodiment, the reinforcing plate 114 is configured for being positioned between the first and second flanges 110A, 110B (FIG. 9) of the vertical fence post with a major face of the reinforcing plate being abutted against a major surface of the web 112 that extends between the first and second flanges 110A, 110B. In one embodiment, first and second reinforcing plates 116 may be secured over respective major faces of the web 112 for clamping a section of the web between the first and second reinforcing plates 116.

In one embodiment, the reinforcing plate 114 preferably includes one or more openings 120 that are configured to receive fasteners (e.g., screws, nut and bolt combinations) for securing the reinforcing plate 114 to an upper end of a vertical fence post.

In one embodiment, a first reinforcing plate may be placed in contact with a first major surface 115A (FIG. 9) of the web 112 of a vertical fence post and a second reinforcing plate may be placed in contact with a second major surface 115B (FIG. 9) of the web 112. The reinforcing plates may be positioned at the upper end of the vertical fence post with the fasteners being passed through the aligned openings 120 for securing the reinforcing plates on opposite sides of the web 112. In one embodiment, the reinforcing plates are preferably positioned over a section of the vertical fence post that includes the wire receiving slot 106 (FIG. 9) for reinforcing the upper end of the vertical fence post and/or for retaining the conductive wires and data cables within the wire receiving channel of the wire receiving slot.

Figure 11A:
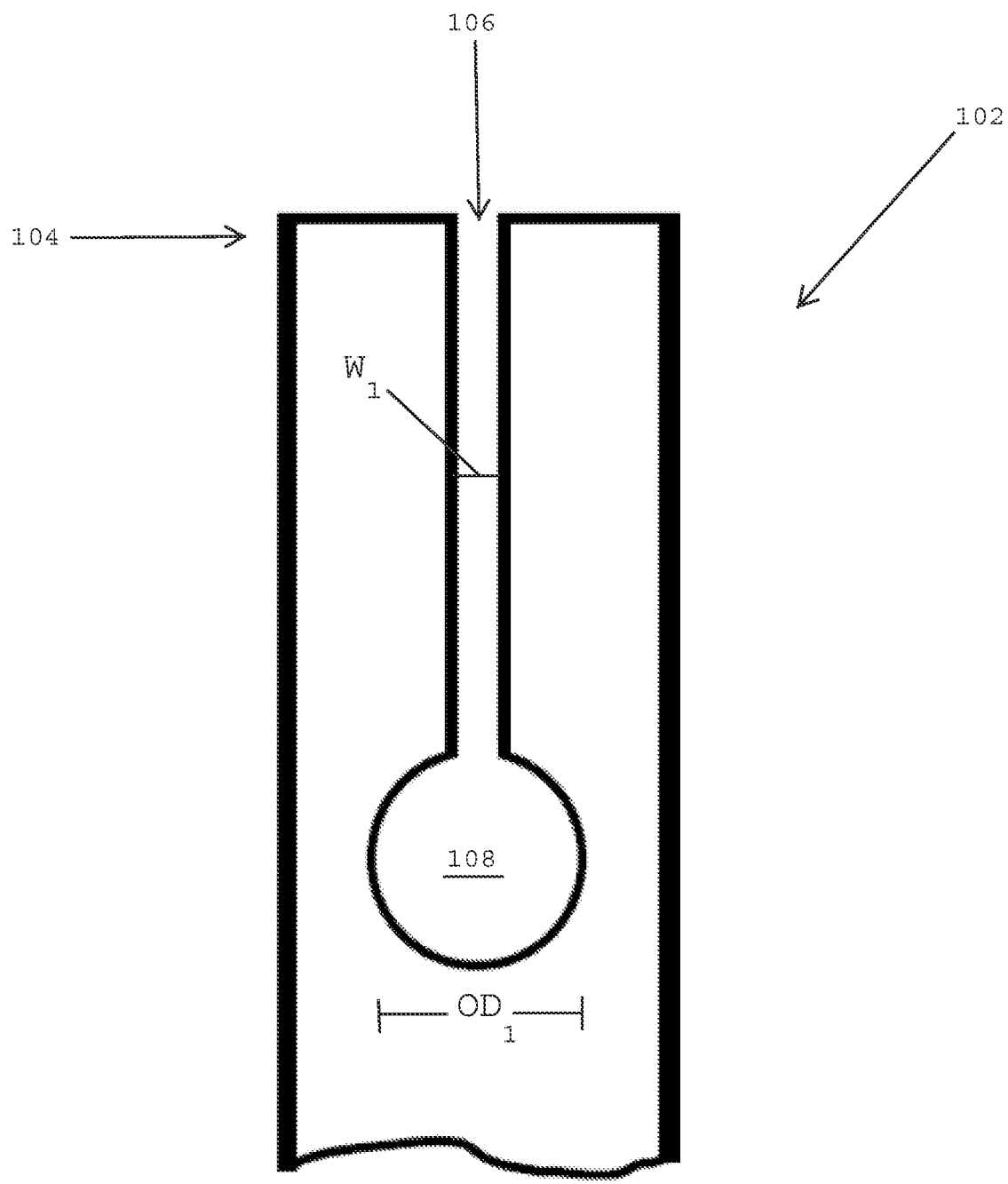
FIG. 11A illustrates a first stage of a method of installing an electrically conductive wire within a wire receiving slot formed in an upper end of a vertical fence post of a perimeter security fence, in accordance with one embodiment of the present patent application.

Referring to FIG. 11A, in one embodiment, a method of installing one or more conductive wires and/or data cables within a wire receiving slot 106 located at an upper end 104 of a vertical fence post 102 preferably includes identifying the vertical fence post in which the conductive wires and/or data cables will be installed. The vertical fence post 102 desirably includes the wire receiving slot 106 formed in the upper end 104 of the vertical fence post 102. The lower end of the wire receiving slot 106 desirably includes a wire receiving channel 108 having the outer diameter $OD_1$ that is larger than the width $W_1$ of the wire receiving slot 106.

Figure 11B:
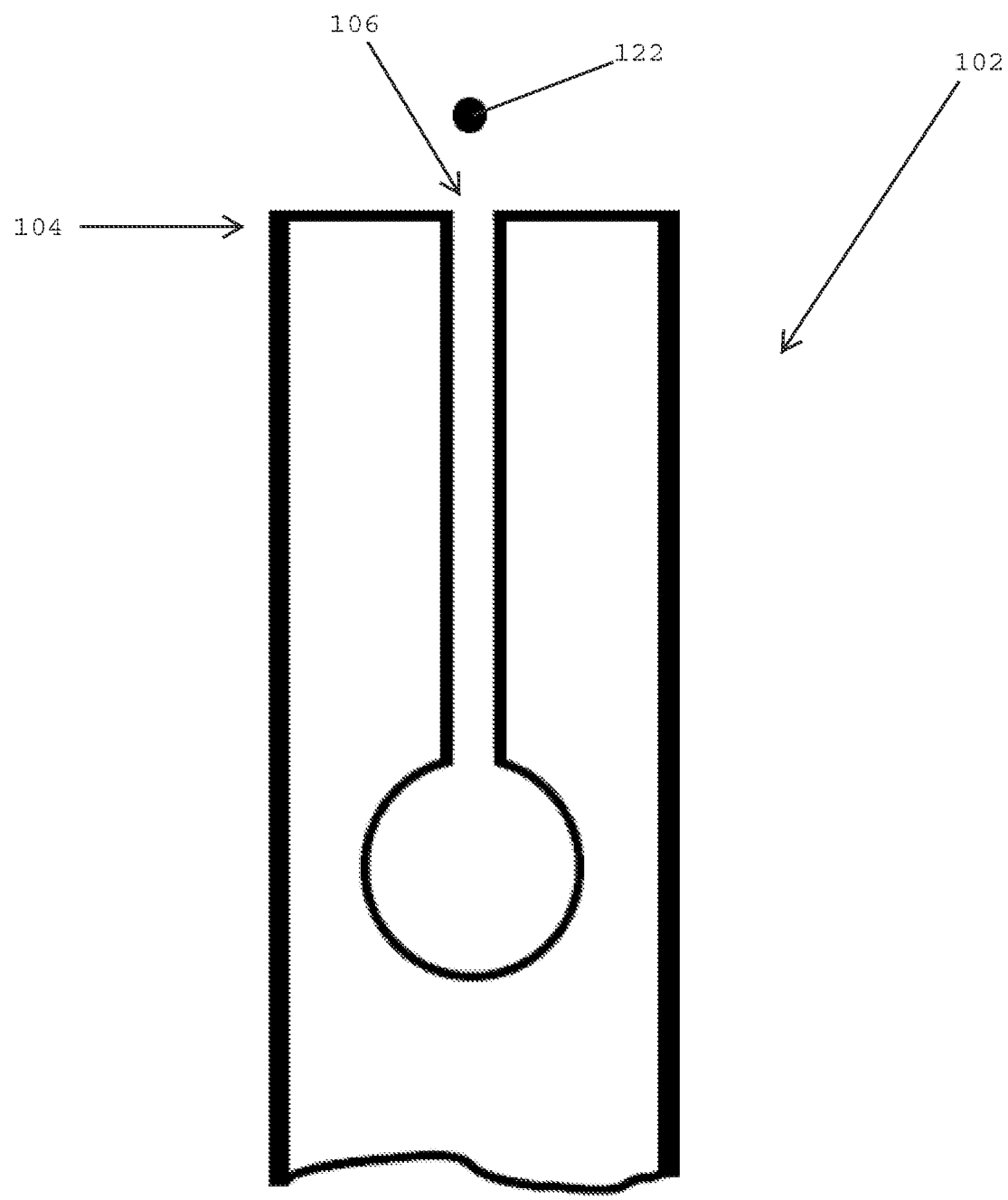
FIG. 11B illustrates a second stage of a method of installing an electrically conductive wire within a wire receiving slot formed in an upper end of a vertical fence post of a perimeter security fence, in accordance with one embodiment of the present patent application.

Referring to FIG. 11B, in one embodiment, in order to install an electrically conductive wire 122 (or data cable) into the wire receiving slot 106 of the vertical fence post 102, the conductive wire 122 (or data cable) is juxtaposed with the opening of the wire receiving slot 106 that is located at the upper end 104 of the wire receiving slot 106.

Figure 11C:
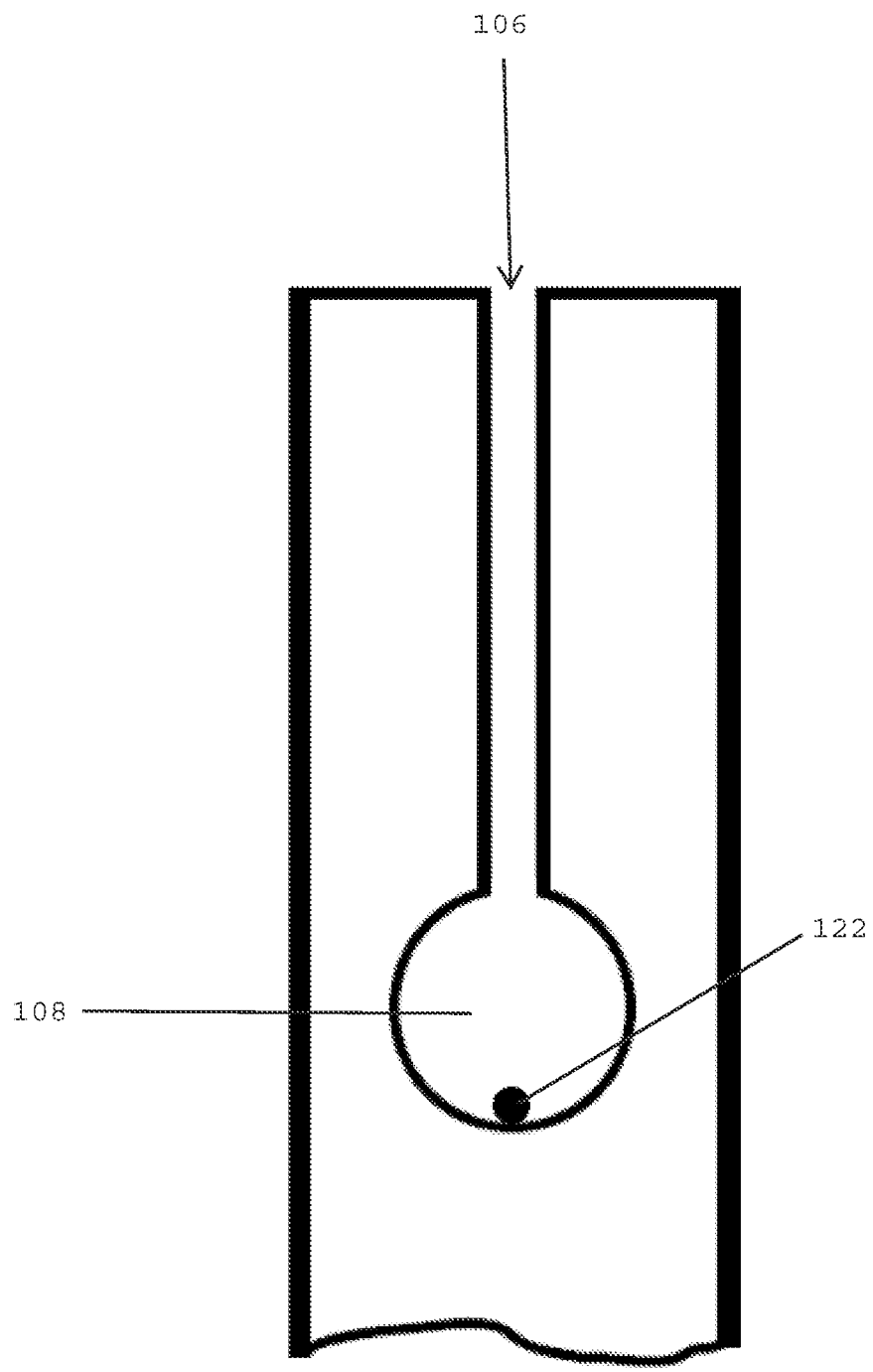
FIG. 11C illustrates a third stage of a method of installing an electrically conductive wire within a wire receiving slot formed in an upper end of a vertical fence post of a perimeter security fence, in accordance with one embodiment of the present patent application.

Referring to FIG. 11C, in one embodiment, the conductive wire 122 is passed through the open, upper end of the wire receiving slot 106 and advanced toward the lower end of the wire receiving slot until the conductive wire is seated within the wire receiving channel 108. In one embodiment, additional conductive wires and/or data cables may be passed through the wire receiving slot for being seated with the wire receiving channel 108.

Figure 11D:
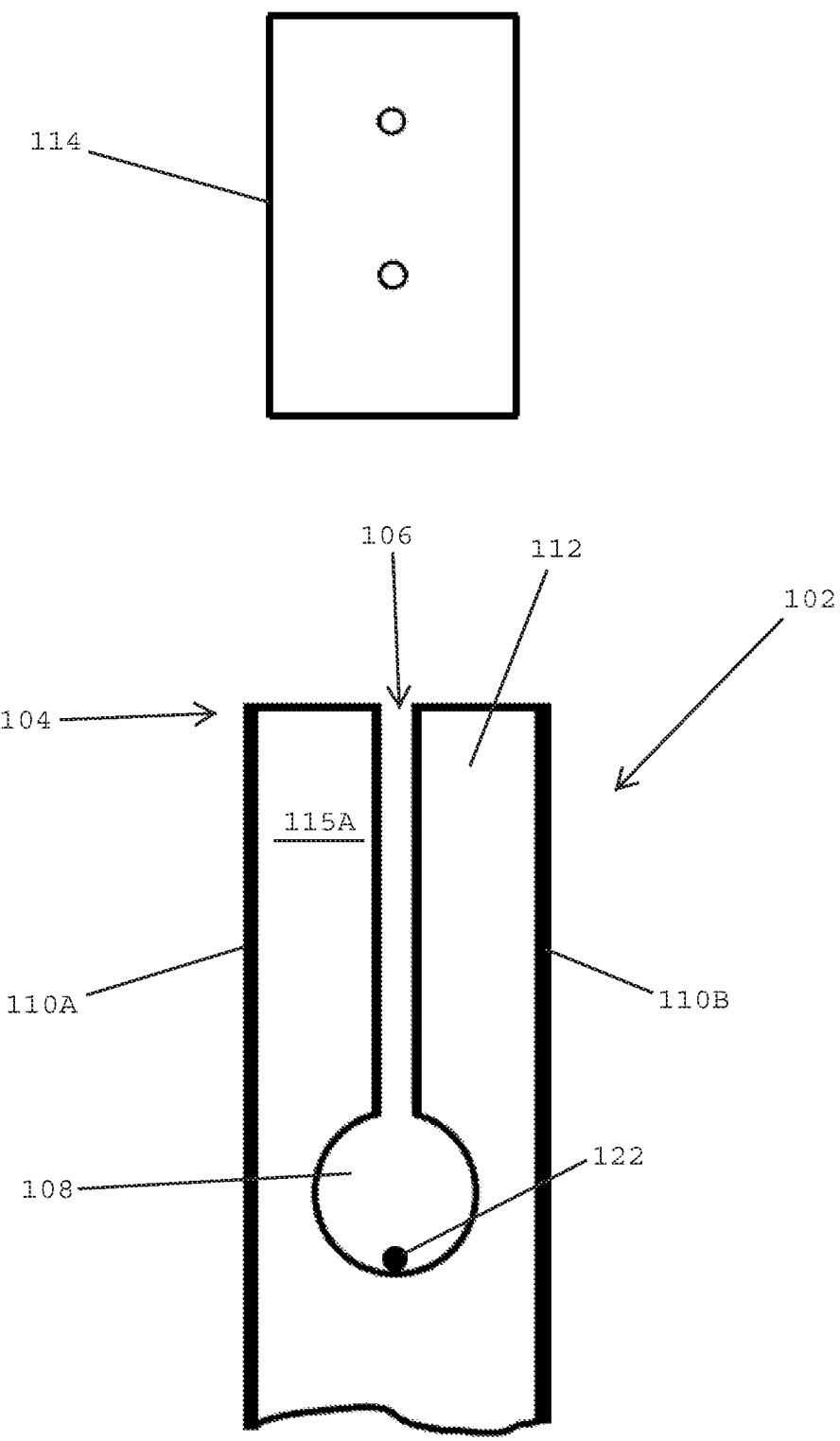
FIG. 11D illustrates a fourth stage of a method of installing an electrically conductive wire within a wire receiving slot formed in an upper end of a vertical fence post of a perimeter security fence, in accordance with one embodiment of the present patent application.

Referring to FIG. 11D, in one embodiment, after the conductive wire 122 has been seated within the wire receiving channel 108 at the closed, lower end of the wire receiving slot 106, a reinforcing plate 114 may be secured to the upper end 104 of the vertical fence post 102. In one embodiment, the reinforcing plate 114 is desirably positioned between the first and second flanges 110A, 110B of the vertical fence post 102 with a major surface of the reinforcing plate engaging a major surface 115B of the web 112 of the vertical fence post 102.

Figure 11E:
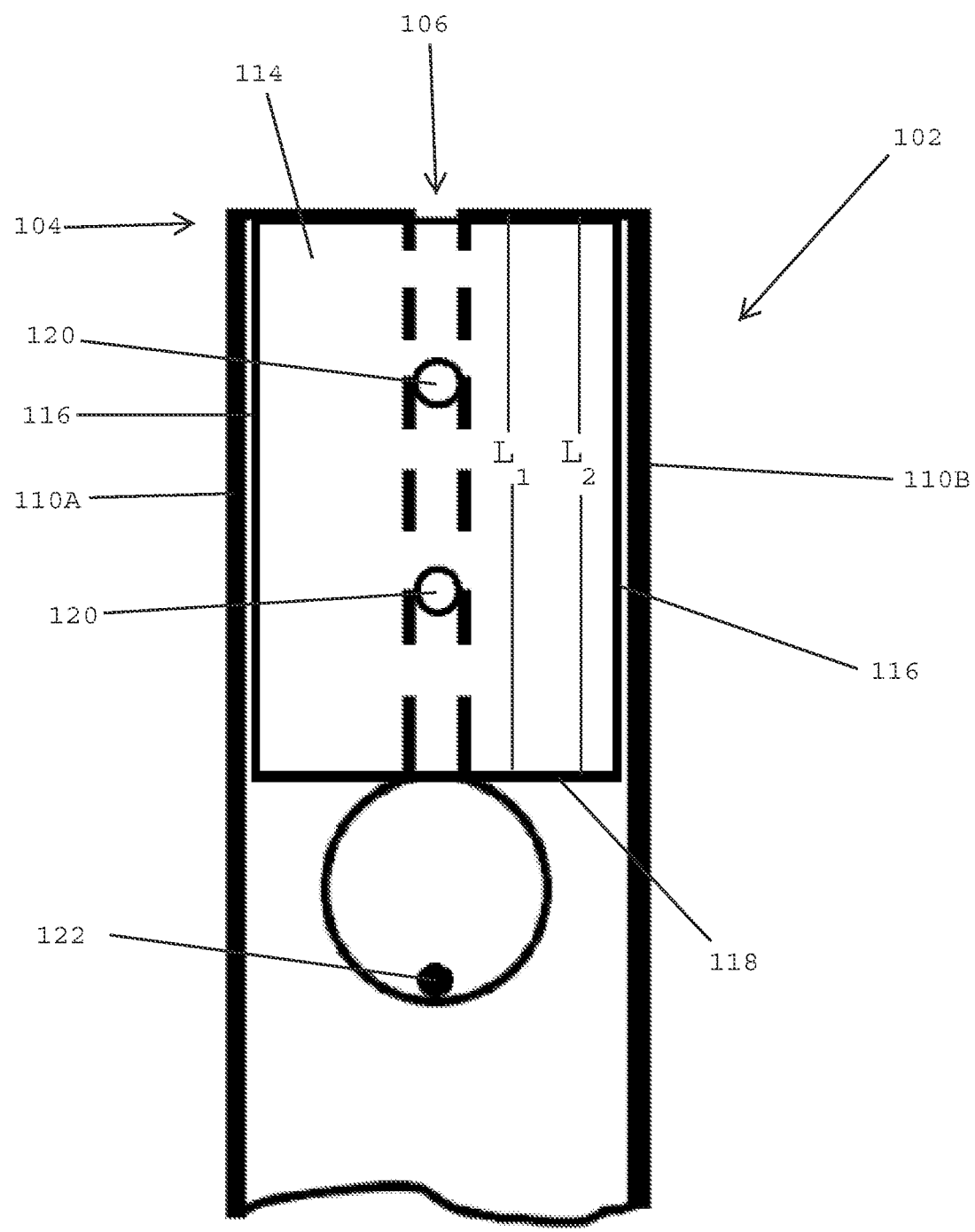
FIG. 11E illustrates a fifth stage of a method of installing an electrically conductive wire within a wire receiving slot formed in an upper end of a vertical fence post of a perimeter security fence, in accordance with one embodiment of the present patent application.

Referring to FIG. 11E, in one embodiment, the reinforcing plate 114 is disposed between the first and second flanges 110A, 110B of the vertical fence post 102. The longer sides 116 of the reinforcing plate 114 may be parallel with the longitudinal axes of the respective first and second flanges 110A, 110B, and the shorter sides 118 of the reinforcing plate 114 may be perpendicular to the longitudinal axes of the respective first and second flanges 110A, 110B. In one embodiment, the reinforcing plate 114 may have a length $L_1$ that is substantially equal to the length $L_2$ of the upper section of the wire receiving slot 106 (FIG. 11D) formed in the upper end 104 of the vertical fence post 102.

In one embodiment, the first and second fastener receiving openings 120 of the reinforcing plate 114 may be aligned with the longitudinal axis of the wire receiving slot 106 so that fasteners (e.g., nut and bolt combinations; threaded screws) may be passed through the respective openings 120 for securing and/or clamping the reinforcing plate to the web 112 (FIG. 11D) of the vertical fence post 102.

Although the present patent application is not limited by any particular theory of operation, it is believed that utilizing reinforcing plates 114 secured to the upper end 104 of the vertical fence post 102 will reinforce and strengthen the section of the vertical fence post that includes the wire receiving slot 106. In one embodiment, the one or more reinforcing plates 114 preferably span the gap defined by the wire receiving slot 106 to reinforce and/or strengthen the upper end 104 of the vertical fence post 102.

Figure 12A:
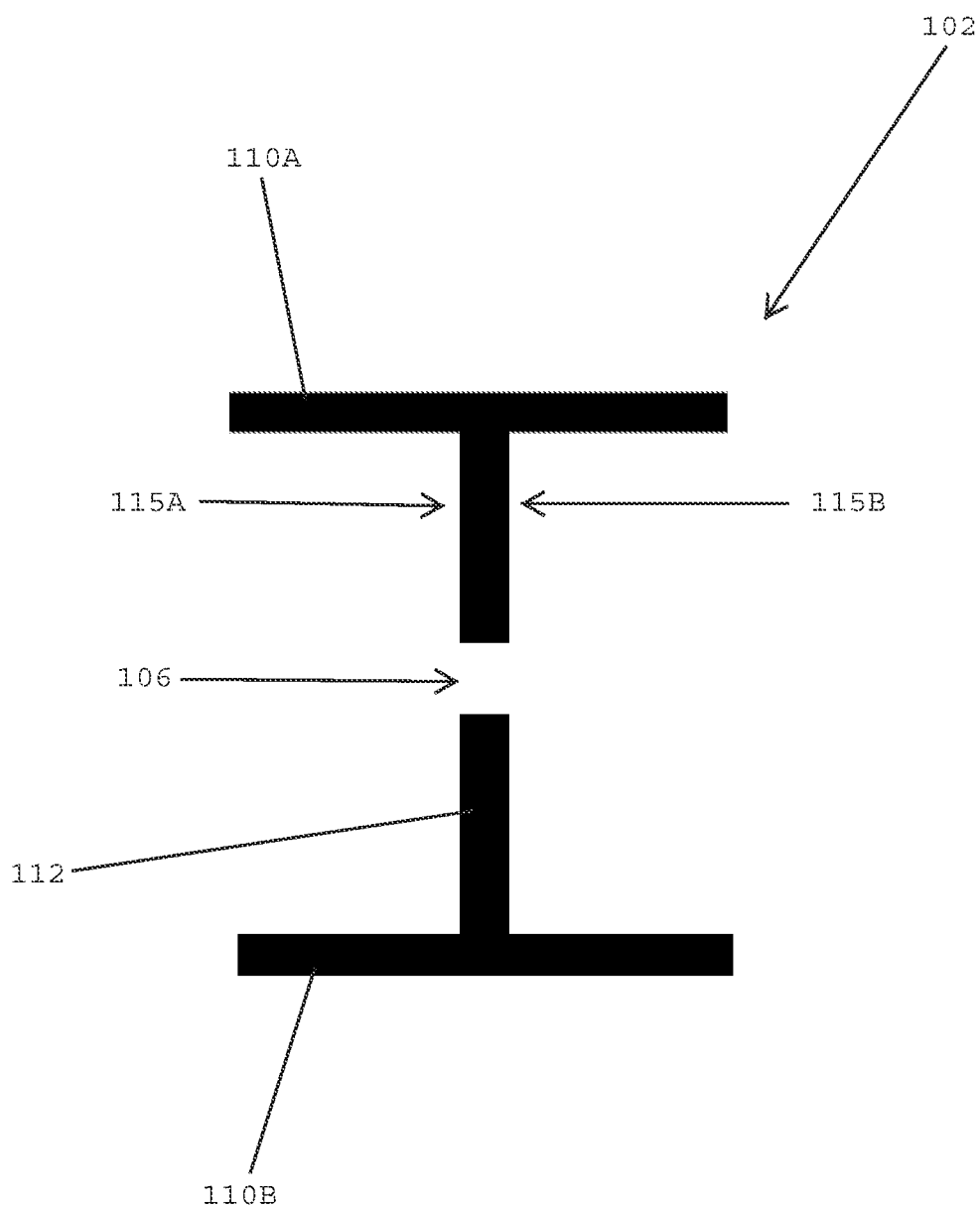
FIG. 12A is a top view of the upper end of the vertical fence post of the perimeter security fence shown in FIG. 11A.

Referring to FIG. 12A, in one embodiment, the vertical fence post 102 preferably includes the first and second flanges 110A, 110B and the web 112 that extends between the first and second flanges 110A, 110B. In one embodiment, the web 112 desirably includes first and second major faces 115A, 115B that extend along the length of the web. In one embodiment, the wire receiving slot 106 is formed in the upper end of the web 112 and extends part of the way toward the lower end of the vertical fence post 102, as shown and described above in FIG. 8 of the present patent application.

Figure 12B:
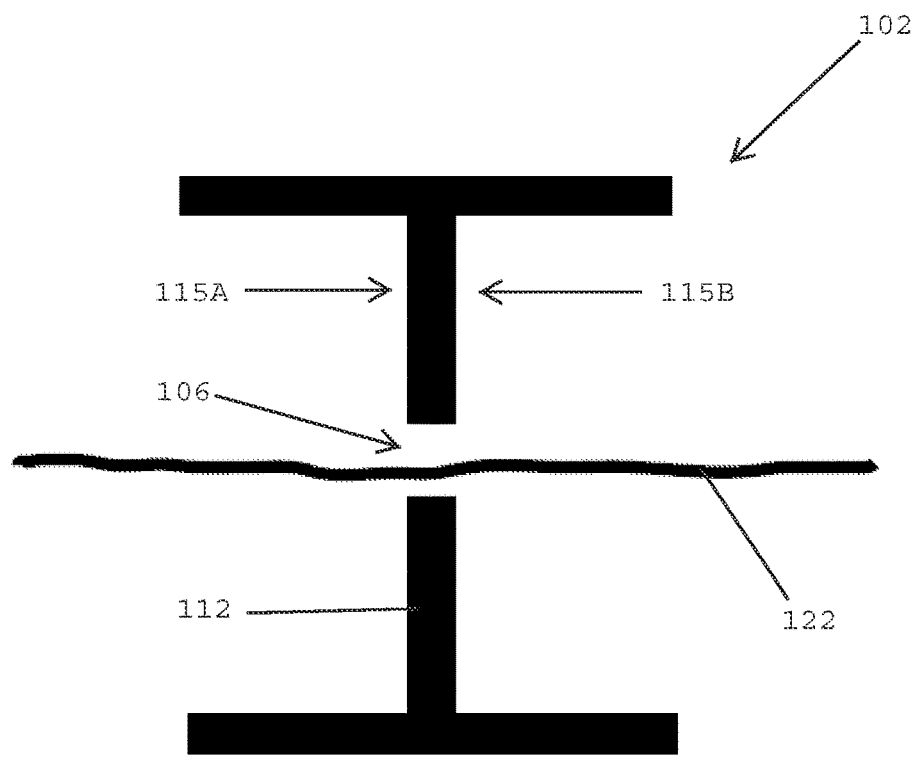
FIG. 12B is a top view of the vertical fence post and the conductive wire shown in FIG. 11B.

Referring to FIG. 12B, in one embodiment, the electrically conductive wire 122 (or data cable) is preferably installed within the wire receiving slot 106 formed in the upper end of the web 112 of the vertical fence post 102. In one embodiment, one or more electrically conductive cables and/or one or more data cables may be disposed within the wire receiving slot 106 for installing the conductive wires and/or data cables within the wire receiving slot 106.

Figure 13:
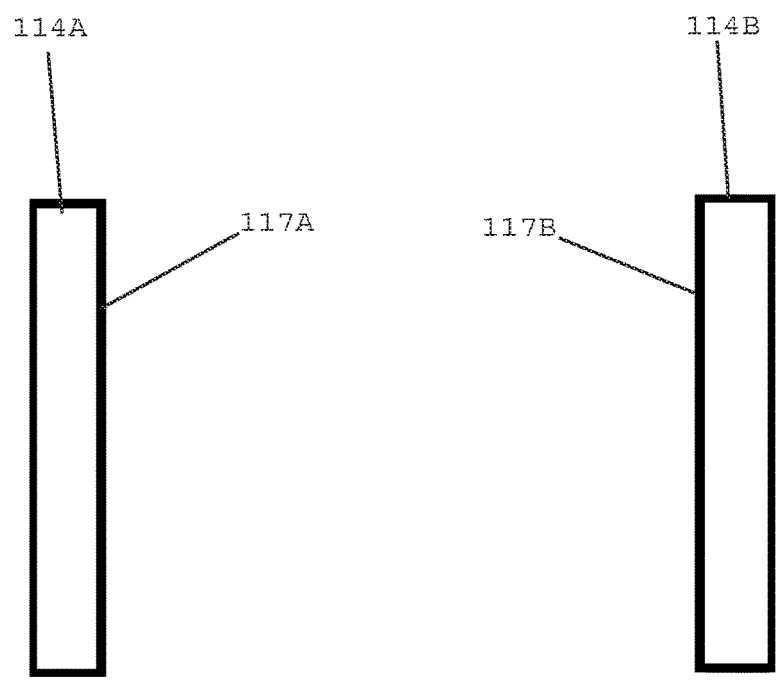
FIG. 13 is a top view of a pair of reinforcing plates that are configured for reinforcing an upper end of a vertical fence post of a perimeter security fence, in accordance with one embodiment of the present patent application.

Referring to FIG. 13, in one embodiment, a pair of reinforcing plates 114A, 114B may be utilized for reinforcing the upper end of the vertical fence post 102 shown in FIG. 12B. In one embodiment, the first reinforcing plate 114A has a major surface 117A that is preferably configured for being abutted against the first major surface 115A of the web 112. In one embodiment, the second reinforcing plate 114B has a major surface 117B that is preferably configured for being abutted against the second major surface 115B of the web 112. In one embodiment, the section of the web 112 of the vertical fence post 102 having the wire receiving slot 106 (FIG. 12B) formed therein may be sandwiched/clamped between the pair of first and second reinforcing plates 114A, 114B for reinforcing the upper end of the vertical fence post.

Figure 14:
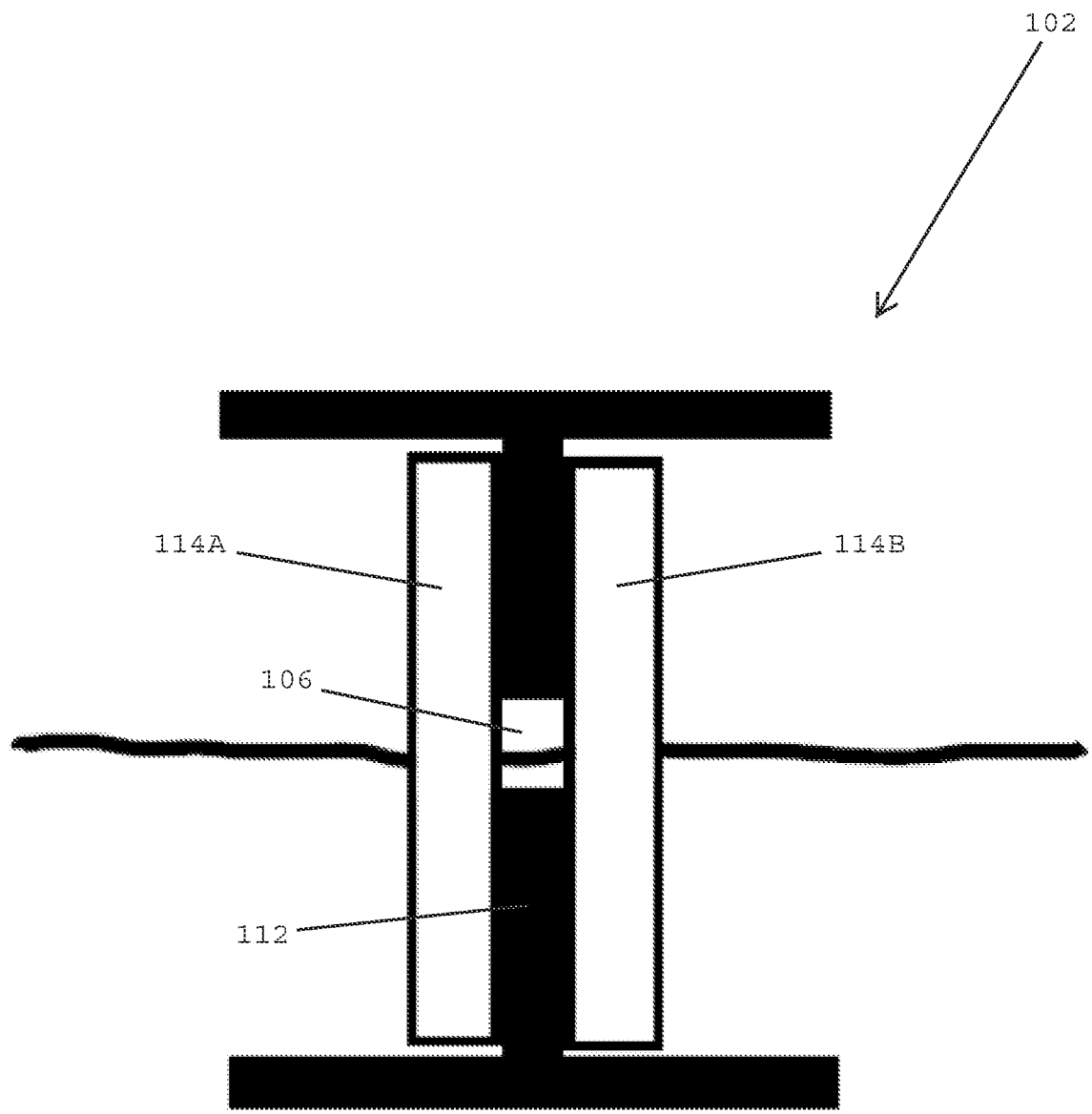
FIG. 14 is a top view of the vertical fence post and the electrically conductive wire shown in FIG. 11E with first and second reinforcing plates secured to an upper end of the vertical fence post for reinforcing the section of the upper end of the vertical fence post that has a wire receiving slot, in accordance with one embodiment of the present patent application.

Referring to FIG. 14, in one embodiment, the first reinforcing plate 114A is preferably abutted against the first major surface 115A (FIG. 12B) of the web 112 of the vertical fence post 102. In one embodiment, the second reinforcing plate 114B is preferably abutted against the second major face 115B (FIG. 12B) of the web 112 of the vertical fence post 102. In one embodiment, the first and second fastener openings 120 (FIG. 10) of the respective reinforcing plates 114A, 114B are desirably aligned with the wire receiving slot 106 formed in the upper end of the web 112 of the vertical fence post 102. Fasteners may be passed through the aligned openings 120 of the respective first and second reinforcing plates 114A, 114B for clamping the upper end of the web 112 between the two reinforcing plates. The fasteners may be tightened for increasing the clamping force applied by the first and second reinforcing plates 114A, 114B. The first and second reinforcing plates preferably extend over both sides of the wire receiving slot 106 for reinforcing and/or enhancing the structural integrity of the upper end of the web 112, which, in turn, reinforces the upper end of the vertical fence post 102.

Figure 15:
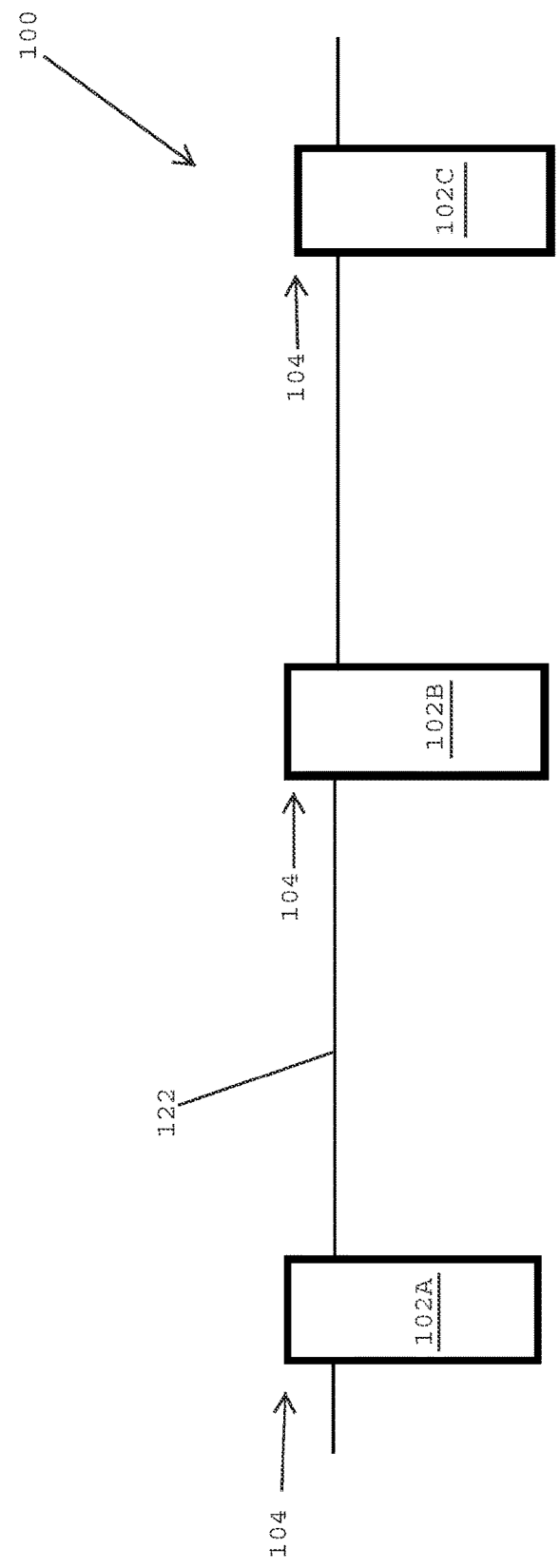
FIG. 15 is a schematic view of upper ends of vertical fence posts of a perimeter security fence with an electrically conductive wire installed in wire receiving slots formed in the upper ends of the respective vertical fence posts, in accordance with one embodiment of the present patent application.

Referring to FIG. 15, in one embodiment, a perimeter security fence 100 preferably includes a plurality of vertical fence posts 102A-102C that are spaced from one another along a fence line. Although not shown in FIG. 15 for simplifying the illustration, the perimeter security fence 100 may include horizontally extending fence bars, chain link, vertical slats, etc., which extend between the vertical fence posts. One or more elongated, electrically conductive wires 122 (or data cables) may be inserted into the respective wire receiving slots 106 (FIG. 11C) formed adjacent the upper ends 104 of the respective vertical fence posts 102A-102C.

Figure 16:
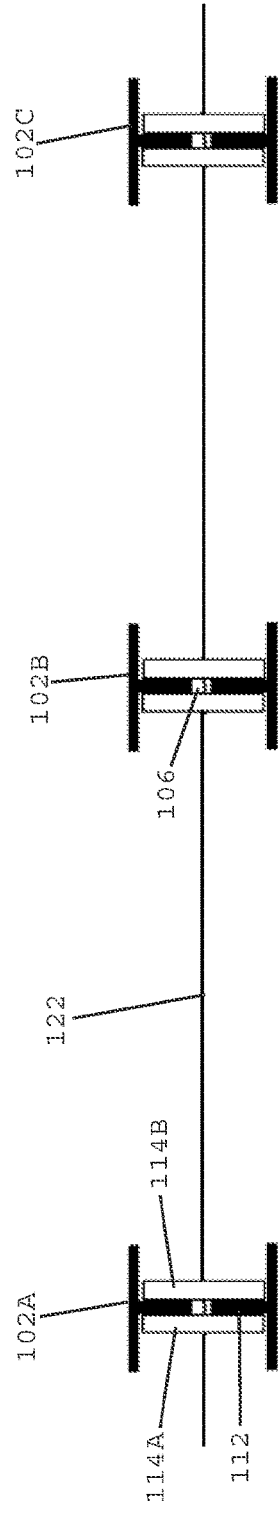
FIG. 16 shows a top view of the vertical fence posts and the electrically conductive wire shown in FIG. 15.

Referring to FIG. 16, in one embodiment, the one or more elongated, electrically conductive wires 122 (or data cables) preferably extend between the spaced vertical fence posts 102A-102C. First and second reinforcing plates 114A, 114B are preferably secured to the webs 112 of the respective vertical fence posts 102A-102C for reinforcing the upper ends of the respective vertical fence posts in the vicinity of the wire receiving slots 106 (FIG. 11C).

Referring to FIGS. 17A and 17B, in one embodiment, one or more vertical fence posts 202 of a perimeter security fence may have a tubular or square cross-sectional shape. In one embodiment, a first wire receiving slot 206A is formed in a first outer wall 290 of the vertical fence post and second wire receiving slot 206B is formed in a second outer wall 292 of the vertical fence post that opposes the first outer wall 290. The first and second wire receiving slots 206A, 206B of the vertical fence post are desirably in alignment with one another. One or more electrically conductive wires and/or data cables may be seated within the first and second wire receiving slots for installing the wires/cables on the perimeter security fence.

Referring to FIG. 18, in one embodiment, a reinforcing cap 294 may be secured over the upper end 204 of the vertical fence post 202 for reinforcing the structural integrity of the vertical fence post in the vicinity of the first and second wire receiving slots 206A, 206B. In one embodiment, the reinforcing cap 294 preferably retains the wires/cables within the first and second wire receiving slots 206A, 206B.

Figure 19:
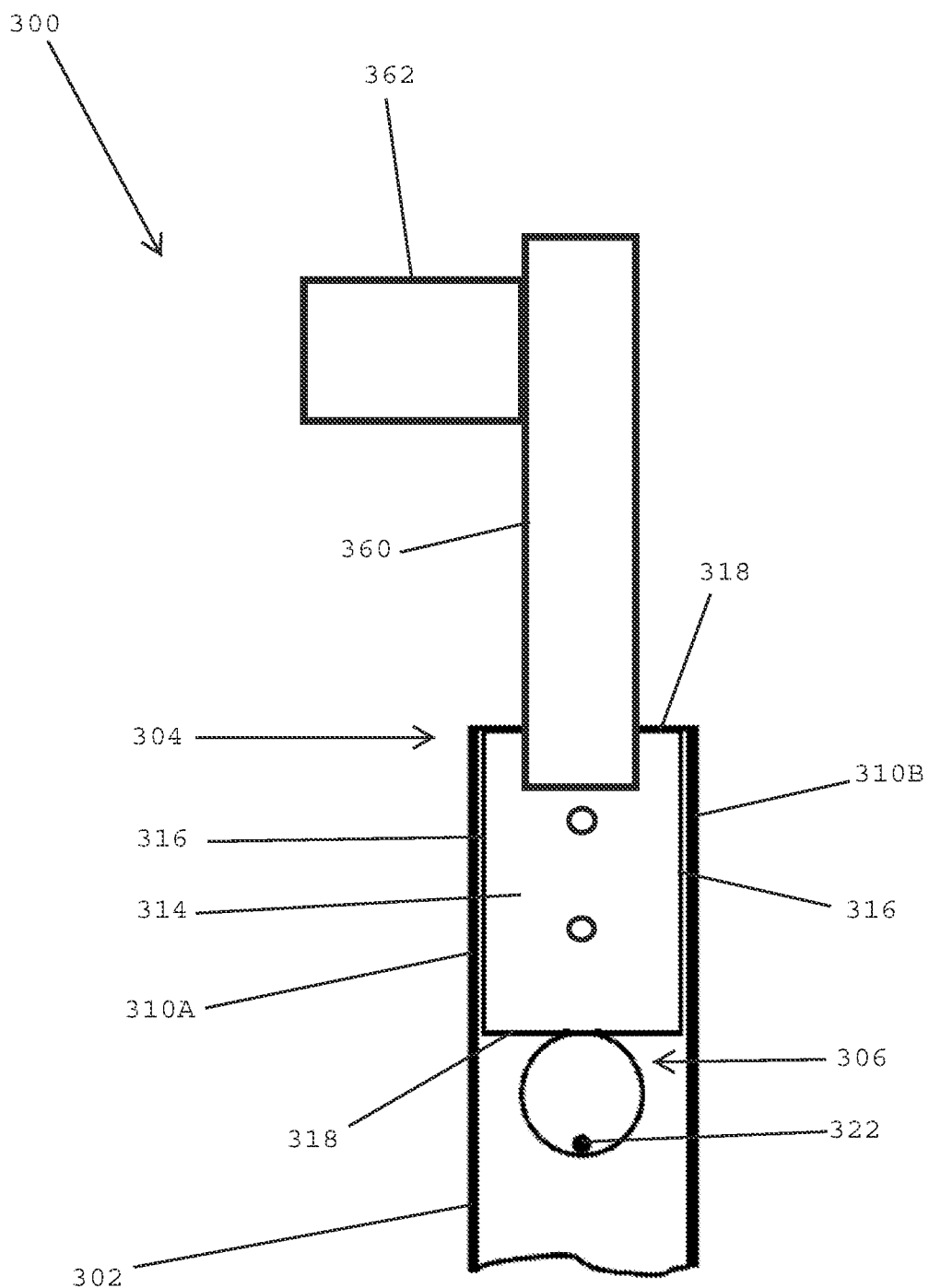
FIG. 19 is a schematic view of an upper end of a vertical fence post of a perimeter security fence with a reinforcing plate secured to the upper end of the vertical fence post, the reinforcing plate including an extension arm that projects above the top of the perimeter security fence and a security device secured to the extension arm, in accordance with one embodiment of the present patent application.

Referring to FIG. 19, in one embodiment, a perimeter security fence 300 preferably includes at least one vertical fence post 302 having an upper end 304 with a reinforcing plate 314 secured to the upper end of the vertical fence post.

In one embodiment, the reinforcing plate 314 is preferably disposed between first and second flanges 310A, 310B of the vertical fence post 302. The longer sides 316 of the reinforcing plate 314 may be parallel with the longitudinal axes of the respective first and second flanges 310A, 310B, and the shorter sides 318 of the reinforcing plate 314 may be perpendicular to the longitudinal axes of the respective first and second flanges 310A, 310B. In one embodiment, the reinforcing plate 314 is secured over the upper section of the wire receiving slot 306 formed in the upper end 304 of the vertical fence post 302. In one embodiment, the reinforcing plate 314 is configured for reinforcing the upper end 304 of the vertical fence post 302.

In one embodiment, the reinforcing plate 314 preferably includes an extension arm 360 that desirably projects above the top of the perimeter security fence 300 and a security device 362, such as a camera, which may be attached to the extension arm 360. In one embodiment, the security device 362 may be secured to an upper end of the extension arm 360. In one embodiment, the security device 362 may be connected with one or more electrically conductive wires 322 and/or one or more data cables that pass through the wire receiving slots 306 of the vertical fence posts 302 of the perimeter security fence for providing power and/or communications capabilities for the security device 362.

Figure 20:
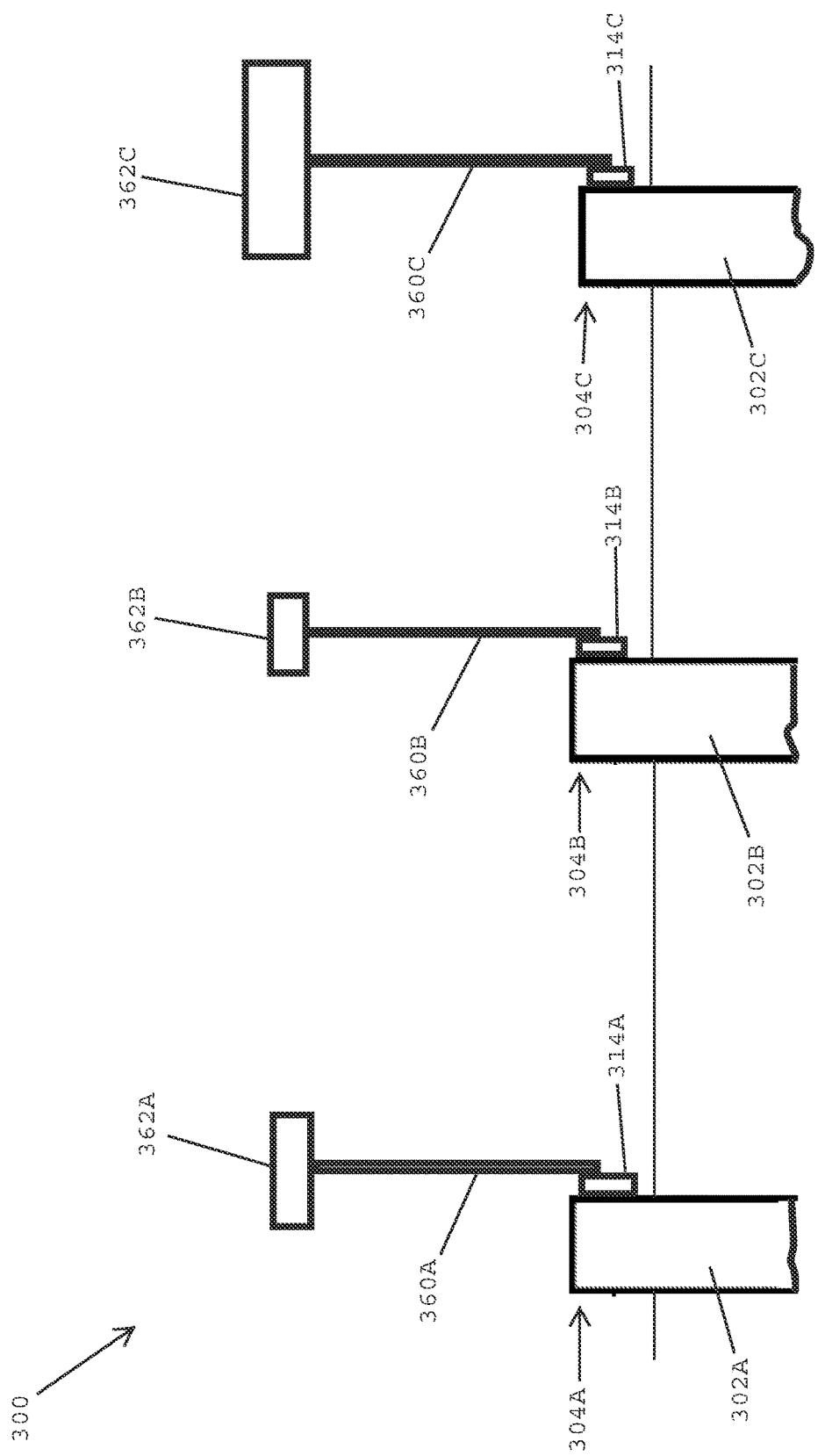
FIG. 20 is a schematic view of upper ends of respective vertical fence posts of a perimeter security fence with reinforcing plates secured to the upper ends of the respective vertical fence posts, the reinforcing plates including extension arms projecting above the top of the perimeter security fence and security devices attached to the respective extension arms, in accordance with one embodiment of the present patent application.

Referring to FIG. 20, in one embodiment, a perimeter security fence 300 includes a plurality of vertical fence posts 302A-302C that are spaced from one another along a fence line defined by the perimeter security fence.

In one embodiment, a first reinforcing plate 314A, which may be similar to the reinforcing plate shown and described above in FIG. 19, is secured to an upper end 304A of the first vertical fence post 302A. In one embodiment, the first reinforcing plate 314A preferably includes a first extension arm 360A that extends above the top of the perimeter security fence. In one embodiment, a first security device 362A (e.g., an alarm) is attached to the first extension arm 360A for positioning the first security device 362A above the top of the perimeter security fence 300.

In one embodiment, a second reinforcing plate 314B having a second extension arm 360B is secured to an upper end 304B of the second vertical fence post 302B. In one embodiment, a second security device 362B (e.g., a laser) is attached to the second extension arm 360B for positioning the second security device 362B above the top of the perimeter security fence 300.

In one embodiment, a third reinforcing plate 314C having a third extension arm 360C is secured to an upper end 304C of the third vertical fence post 302C. In one embodiment, a third security device 362C (e.g., a camera) is attached to the third extension arm 360C for positioning the third security device 362C above the top of the perimeter security fence 300.

In one embodiment, the security devices secured to the respective extension arms 360A-360C may include but are not limited to low voltage security lights, visible alarms, audible alarms, lasers, cameras, motion sensors, fiber optics, and warning lights.

In one embodiment, only some of the reinforcing plates that are secured to vertical fence posts may have extension arms attached thereto. For example, every second or third reinforcing plate may have an extension arm secured thereto.

In one embodiment, when a security need arises, a security device may be mounted on a perimeter security fence by attaching an extension arm to a previously installed reinforcing plate. Thus, the particular locations where reinforcing plates and security devices are mounted on perimeter security fences may be modified and/or customized.

While the foregoing is directed to embodiments of the present invention, other and further embodiments of the invention may be devised without departing from the basic scope thereof, which is only limited by the scope of the claims that follow. For example, the present invention contemplates that any of the features shown in any of the embodiments described herein, or incorporated by reference herein, may be incorporated with any of the features shown in any of the other embodiments described herein, or incorporated by reference herein, and still fall within the scope of the present invention.

What is claimed is:

1. A perimeter security fence comprising:
   a plurality of vertical fence posts spaced from one another along a fence line of said perimeter security fence, each said vertical fence post having an upper end and a lower end;
   a wire receiving slot formed in each said vertical fence post, each said wire receiving slot having an open, upper end and a closed, lower end;
   one or more conductive wires or cables disposed within said wire receiving slots of said vertical fence posts;
   at least one reinforcing plate secured to each said vertical fence post for covering a gap in said vertical fence post defined by said wire receiving slot;
   at least one fastener for securing said at least one reinforcing plate to each said vertical fence post, at least one of said at least one fastener extending through said wire receiving slot;
   wherein said at least one reinforcing plate is configured to enhance the structural integrity of said vertical fence post in the vicinity of said wire receiving slot and retain said one or more conductive wires or cables within said wire receiving slot;
   one or more security devices secured to said perimeter security fence and being coupled with said one or more conductive wires or cables disposed within said wire receiving slots of said vertical fence posts.

2. The perimeter security fence as claimed in claim 1, wherein said one or more conductive wires or cables disposed within said wire receiving slots of said vertical fence posts extend along the fence line of said perimeter fence.

3. The perimeter security fence as claimed in claim 1, wherein each said vertical fence post comprises:
   an elongated body having an I-beam shape including first and second flanges and a web that interconnects said first and second flanges, wherein said first and second flanges and said web have respective lengths that extend between the upper and lower ends of said vertical fence post;
   wherein said wire receiving slots are formed in upper ends of said webs and extend toward lower ends of said webs of said respective vertical fence posts.

4. The perimeter security fence as claimed in claim 3, wherein each said wire receiving slot comprises an upper section defining a width and a lower section including a wire receiving channel defining an outer diameter that is greater than the width of the upper section of said wire receiving slot.

5. The perimeter security system as claimed in claim 3, wherein said at least one reinforcing plate that is secured to each said vertical fence post comprises:
   a first reinforcing plate engaging a first major surface of said web;
   a second reinforcing plate engaging a second major surface of said web and being aligned with said first reinforcing plate;
   said at least one fastener interconnecting said first and second reinforcing plates.

6. The perimeter security fence as claimed in claim 5, further comprising:
   said first reinforcing plate having at least one fastener opening;
   said second reinforcing plate having at least one fastener opening that is aligned with the at least one fastener opening of said first reinforcing plate;
   said at least one fastener passing through said aligned fastener openings of said first and second reinforcing plates.

7. The perimeter security fence as claimed in claim 1, wherein said one or more security devices comprise one or more security light fixtures secured to said perimeter security fence, and wherein each of said one or more security light fixtures is secured to one of said vertical fence posts.

8. The perimeter security fence as claimed in claim 1, further comprising:
   an extension arm secured to one of said reinforcing plates, wherein said extension arm projects above the upper ends of the vertical fence posts;
   one of said one or more security devices being attached to said extension arm.

9. The perimeter security fence as claimed in claim 1, wherein said one or more security devices are selected from the group of security devices consisting of low voltage security lights, alarms, lasers, cameras, motion sensors, fiber optics, and warning lights.

10. The perimeter security fence as claimed in claim 1, wherein the open upper end of each said wire receiving slot is located at the upper end of said vertical fence post.

11. The perimeter security fence as claimed in claim 10, wherein each said wire receiving slot has an upper section defining a first width and a lower section including a wire receiving channel that defines a second width that is greater than the first width of the upper section of said wire receiving slot.

12. A perimeter security fence comprising:
   at least one vertical fence post having an upper end and a lower end;
   a wire receiving slot formed in an upper section of said at least one vertical fence post, wherein said wire receiving slot has an open, upper end and a closed, lower end;
   a reinforcing plate secured to the upper section of said at least one vertical fence post and overlying said wire receiving slot for enhancing the structural integrity of the upper section of said at least one vertical fence post that contains said wire receiving slot, and,
   at least one fastener for securing said reinforcing plate to the upper section of said at least one vertical fence post, at least one of said at least one fastener extending through said wire receiving slot.

13. The perimeter security fence as claimed in claim 12, further comprising one or more conductive wires or cables disposed within said wire receiving slot of said at least one vertical fence post, wherein said reinforcing plate retains said one or more conductive wires or cables within said wire receiving slot.

14. The perimeter security fence as claimed in claim 13, further comprising one or more security devices secured to said perimeter security fence and being coupled with said one or more conductive wires or cables disposed within said wire receiving slot of said at least one vertical fence post.

15. The perimeter security fence as claimed in claim 13, wherein said at least one vertical fence post has an I-beam shape including first and second flanges and a web extending between said first and second flanges, and wherein said wire receiving slot is formed in an upper end of said web.

16. The perimeter security fence as claimed in claim 15, wherein said web of said at least one vertical fence post has a first major face and a second major face, and wherein said wire receiving slot extends from the first major face to the second major face of said web.

17. The perimeter security fence as claimed in claim 16, wherein said retaining plate overlies the first major face of said web, and wherein a second retaining plate overlies the second major face of said web.

18. A perimeter security fence comprising:
   a plurality of vertical fence posts spaced from one another along a fence line of a perimeter security fence, each said vertical fence post having an upper end and a lower end;
   a wire receiving slot formed in said upper end of each said vertical fence post;
   one or more conductive wires or cables disposed within said wire receiving slots of said vertical fence posts, wherein said one or more conductive wires or cables extend along the fence line of said perimeter security fence;
   at least one reinforcing plate secured to each said vertical fence post for covering at least a portion of said wire receiving slot to enhance the structural integrity of said vertical fence post in the vicinity of said wire receiving slot and to retain said one or more conductive wires or cables within said wire receiving slot;
   at least one fastener for securing said at least one reinforcing plate to each said vertical fence post, at least one of said at least one fastener extending through said wire receiving slot formed in said upper end of each said vertical fence post,
   one or more security devices secured to said perimeter security fence and being coupled with said one or more conductive wires or cables disposed within said wire receiving slots of said vertical fence posts.

19. The perimeter security fence as claimed in claim 18, wherein each said vertical fence post comprises:
   an elongated body having an I-beam shape including first and second flanges and a web that interconnects said first and second flanges, wherein said first and second flanges and said web have respective lengths that extend between the upper and lower ends of said vertical fence post;
   wherein said wire receiving slots are formed in upper ends of said webs and extend toward lower ends of said webs of said respective vertical fence posts.

20. The perimeter security fence as claimed in claim 19, further comprising:
   each said wire receiving slot comprises an upper section defining a width and a lower section including a wire receiving channel defining an outer diameter that is greater than the width of the upper section of said wire receiving slot;
   said at least one reinforcing plate that is secured to each said vertical fence post comprising a first reinforcing plate engaging a first major surface of said web, a second reinforcing plate engaging a second major surface of said web and being aligned with said first reinforcing plate, and wherein said at least one fastener interconnects said first and second reinforcing plates;
   an extension arm secured to one of said reinforcing plates, wherein said extension arm projects above the upper ends of the vertical fence posts;
   one of said security devices being attached to said extension arm.

* * * * *